United States Patent
Gant et al.

(10) Patent No.: US 11,948,411 B2
(45) Date of Patent: Apr. 2, 2024

(54) ELECTRONIC LOCK, SYSTEM, AND TAKE OVER LOCK MODULE, AND METHOD OF MANAGING THE SAME

(71) Applicant: GRAND DUNES ENTRY SYSTEMS, LLC, Marysville, WA (US)

(72) Inventors: Justin Gant, Redmond, WA (US); Nicholas Schmidt, Mukilteo, WA (US)

(73) Assignee: GRAND DUNES ENTRY SYSTEMS, LLC, Marysville, WA (US)

(*) Notice: Subject to any disclaimer, the term of this patent is extended or adjusted under 35 U.S.C. 154(b) by 0 days.

(21) Appl. No.: 17/680,416

(22) Filed: Feb. 25, 2022

(65) Prior Publication Data

US 2022/0180680 A1 Jun. 9, 2022

Related U.S. Application Data

(63) Continuation of application No. 17/080,658, filed on Oct. 26, 2020, now Pat. No. 11,263,844.

(60) Provisional application No. 63/028,488, filed on May 21, 2020.

(51) Int. Cl.
G07C 9/00 (2020.01)
E05B 47/00 (2006.01)
G06K 7/10 (2006.01)

(52) U.S. Cl.
CPC ...... G07C 9/00309 (2013.01); E05B 47/0001 (2013.01); G06K 7/10297 (2013.01); G07C 9/00563 (2013.01)

(58) Field of Classification Search
CPC ............ G07C 9/00309; G07C 9/00563; E05B 47/0001; G06K 7/10297

USPC ........................................................ 340/5.61
See application file for complete search history.

(56) References Cited

U.S. PATENT DOCUMENTS

| | | | |
|---|---|---|---|
| 6,472,973 B1 | 10/2002 | Harold | |
| 8,331,544 B2 * | 12/2012 | Kraus | H04L 12/2836 340/5.71 |
| 9,347,242 B2 | 5/2016 | Cregg | |
| 9,894,066 B2 | 2/2018 | Conrad | |
| 10,026,249 B2 | 7/2018 | GrandPre | |
| 10,102,700 B2 | 10/2018 | Wendling | |
| 10,235,822 B2 | 3/2019 | Nye | |
| 10,282,927 B1 | 5/2019 | Hutz | |
| 10,366,556 B1 * | 7/2019 | Mondrow | G07C 9/00309 |
| 10,458,153 B2 | 10/2019 | Nguyen | |
| 10,779,115 B1 * | 9/2020 | Bartucci | H04W 4/029 |
| 11,171,503 B2 * | 11/2021 | Langenberg | E05B 47/00 |
| 11,263,844 B2 * | 3/2022 | Gant | G07C 9/00563 |
| 11,315,394 B1 * | 4/2022 | Jackson | G08B 13/18 |

(Continued)

OTHER PUBLICATIONS

Yale Cloud-Based Access Management for Multi-Family Buildings. [Online] Available at: <https://protect-us.mimecast.com/s/xsDEC1wBjgsmqXwXspR16h?domain=content.assaabloyusa.com> [Web page retrieved Oct. 26, 2020], 9 pages.

(Continued)

*Primary Examiner* — Nam V Nguyen

(57) ABSTRACT

A lock module for use with an electronic lock configured to selectively lock a lockable structure includes a communication subsystem configured to be communicatively coupled to a gateway and configured to be communicatively coupled to an electronic lock, wherein the communication subsystem is further configured to send an unlock signal to the electronic lock.

15 Claims, 8 Drawing Sheets

(56) References Cited

U.S. PATENT DOCUMENTS

| | | |
|---|---|---|
| 2014/0340196 A1 | 11/2014 | Myers |
| 2015/0287256 A1 | 10/2015 | Davis |
| 2016/0014131 A1 | 1/2016 | Neafsey |
| 2016/0371910 A1 | 12/2016 | Baumgarte |
| 2017/0009491 A1 | 1/2017 | Nguyen |
| 2017/0127222 A1 | 5/2017 | Lang |
| 2017/0154483 A1* | 6/2017 | Cordiner ................. H04W 4/30 |
| 2017/0249794 A1 | 8/2017 | Davis |
| 2019/0182669 A1 | 6/2019 | Conrad |
| 2019/0371101 A1 | 12/2019 | Friedli |
| 2020/0252233 A1 | 8/2020 | O'Keeffe |
| 2020/0293756 A1* | 9/2020 | Ainsworth ......... G07C 9/00182 |
| 2020/0402741 A1 | 12/2020 | Huang |
| 2021/0055902 A1 | 2/2021 | Blaser |
| 2021/0074092 A1 | 3/2021 | Davis |
| 2021/0091822 A1 | 3/2021 | Alpert |

OTHER PUBLICATIONS

Yale Smart Modules, Products. [online] Available at: <https://protect-us.mimecast.com/s/16y4CYE16jhZAXoXi)Lfi-14?domain=us.yalehome.com/> [Web page retrieved Oct. 26, 2020], 3 pages.
Yale Accentra, Products [online]. Available at: <https://protect-us.mimecast.com/s/cz3HCZ6m4kSRQYnYujVdj9?domain=us.yalehome.com/> [Web page retrieved Oct. 26, 2020], 3 pages.

* cited by examiner

ELECTRONIC LOCK, SYSTEM, AND TAKE OVER LOCK MODULE, AND METHOD OF MANAGING THE SAME

PRIORITY INFORMATION

The present application is a continuation of U.S. patent application Ser. No. 17/080,658, filed Oct. 26, 2020, now U.S. Pat. No. 11,263,844, issued Mar. 1, 2022, which claims the benefit of U.S. Patent Provisional Application No. 63/028,488, filed May 21, 2020, the contents of which are incorporation herein by reference.

BACKGROUND

Electronic locks, which reduce the need for physical keys, can use RFID key fobs, access codes input to keypads, and biometrics (like a user's fingerprint) to lock or unlock a door or other lockable structure. Communicating with electronic locks can be challenging, often intentionally so as to ensure security. Accordingly many electronic locks lack APIs or SDKs that could otherwise be used to add, modify, or enhance features of the electronic locks.

It is also useful for a system of multiple electronic locks to be able to communicate with a common server through a gateway within a proximity range of the electronic locks. But because of the limited wireless range of certain electronic locks, manufacturer imposed limitations, and/or design deficiencies, multiple gateways may need to be installed so that each electronic lock is within range of a gateway.

In addition, centralized wireless management of the currently installed or available locks may not be feasible. Typical electronic locks require management of the locks locally at the lock with a smart phone, programmer, or a smart card(s) with gatekeeper readers at building entrances. This increases complexity of the management system and increases risk, e.g., it creates security holes in terms of management.

Some electronic lock manufacturers employ a software as a service, or SaaS, model as a method of managing multiple electronic locks. This can allow a user to unlock a lock using a mobile device such as a phone and manage the locks from a cloud-based server for a fee. However, unlocking the lock or changing the code for the lock cannot be done if the mobile phone is dead or missing. Moreover, if the lock needs to be updated in real time and requires a smart card to scan and update the lock, an app on a smart phone may be needed to perform the update, and/or a fee may be required to perform the update.

The requirement to pay for both the lock and the corresponding SaaS service can be costly. In addition, if the lock and the corresponding SaaS service are sold as a set, the user cannot mix and match the locks and services. For example, some services work only with access codes for unlocking the lock, while a user may want to use a key fob instead. Additionally, the manager/owner of the lock is limited to the corresponding service and lock hardware combination. The fixed service and lock hardware combination prevents internal or in-house management of the locks, and/or prevents ownership of the locks and management system outright. Such a setup also precludes lock owners from integrating other building systems into one easily managed system with other vendor products.

Accordingly, it can be appreciated that an improved electronic lock, system, and/or take over module system for use with electronic locks, as well as methods for managing electronic lock systems is desired.

SUMMARY

A lock module for use with an electronic lock configured to selectively lock a lockable structure includes a communication subsystem configured to be communicatively coupled to a gateway and configured to be communicatively coupled to an electronic lock, wherein the communication subsystem is further configured to send an unlock signal to the electronic lock.

An electronic lock includes a lock configured to selectively lock a lockable structure, and a lock module communicatively coupled to the lock. The lock module includes a communication subsystem configured to be communicatively coupled to a gateway and configured to be communicatively coupled to the electronic lock, wherein the communication subsystem is further configured to send an unlock signal to the electronic lock, and wherein receipt of the unlock signal by the electronic lock causes the electronic lock to unlock the lockable structure.

An entry system includes a first electronic lock configured to selectively lock a first lockable structure, and a second electronic lock configured to selectively lock a second lockable structure. The first electronic lock includes a first locking component moveable between at least an engaged position and a disengaged position, a first lock microcontroller configured to actuate the first locking component in response to at least one input signal, and a first communication subsystem communicatively coupled to a first gateway. The second electronic lock includes a second locking component moveable between at least an engaged position and a disengaged position, a second lock microcontroller configured to actuate the second locking component in response to at least one input signal, and a second communication subsystem communicatively coupled to the first communication subsystem of the first lock module.

A lock module for use with an electronic lock is configured to selectively lock a lockable structure. The electronic lock includes a surface configured to register a selection of a plurality of selectable buttons. The lock module includes a housing, a communication subsystem disposed at least partially within the housing, the communication subsystem configured to be communicatively coupled to a gateway, and a touchpad subsystem associated with the housing, the touchpad subsystem including a surface configured to select one or more of the plurality of selectable buttons.

An electronic lock includes a lock configured to selectively lock a lockable structure and a lock module communicatively coupled to the lock. The lock module includes a communication subsystem configured to be communicatively coupled to a gateway and communicatively coupled to the electronic lock. The communication subsystem is further configured to send an unlock signal to the electronic lock, and receipt of the unlock signal by the electronic lock causes the electronic lock to unlock the lockable structure.

An electronic lock system includes a lock configured to selectively lock a lockable structure and a lock module communicatively coupled to the lock. The lock module includes a communication subsystem configured to be communicatively coupled to a gateway and communicatively coupled to the electronic lock. The communication subsystem is further configured to send an unlock signal to the electronic lock, and receipt of the unlock signal by the electronic lock causes the electronic lock to unlock the lockable structure. The electronic lock system further includes a mesh network configured to communicatively couple the lock module to a gateway and communicatively couple the lock module to one or more additional lock modules.

A lock module for use with an electronic lock configured to selectively lock a lockable structure includes a communication subsystem configured to be communicatively coupled to a gateway and configured to be communicatively coupled to the electronic lock. The communication subsystem is further configured to send an unlock signal to the electronic lock and communicatively couple the communication subsystem to a first additional communication subsystem of a first additional lock module. Receipt of the unlock signal by the electronic lock causes the electronic lock to unlock the lockable structure.

A lock module for use with an electronic lock configured to selectively lock a lockable structure includes a communication subsystem configured to be communicatively coupled to a gateway, and one or more sensors configured to receive an input used to selectively lock the lockable structure.

A method for controlling an electronic lock system includes operably connecting a lock module to a lock configured to selectively lock a lockable structure, receiving, by the lock module, information corresponding to unlocking the lockable structure, wherein receipt of the information causes the lock module to unlock the lockable structure.

An entry system includes an electronic lock configured to selectively lock a lockable structure. The electronic lock includes a power supply, a locking component, one or more limit switches configured to detect a position of the locking component moveable between at least an engaged position and a disengaged position, and one or more motors configured to actuate the locking component between the engaged and disengaged positions. The system further includes a first lock module coupled to the electronic lock having a first communication subsystem configured to be communicatively coupled to a second communication subsystem of a second lock module, and a microcontroller communicatively coupled to at least one of the one or more motors and at least one of the one or more limit switches.

A lock module for communicative coupling to an electronic lock configured to selectively lock a lockable structure includes a communication subsystem configured to be communicatively coupled to a gateway and configured to be communicatively coupled to an electronic lock, wherein the communication subsystem is further configured to send an unlock signal to the electronic lock.

A method of registering a proximity card for selectively activating one or more electronic lock systems when the proximity card is brought within a predefined distance of a proximity card reader of the one or more electronic lock systems includes:

receiving, at a system administrator computing device, a first signal indicating a registration request for the proximity card such that the proximity card can selectively activate one or more electronic lock systems managed by the system administrator computing device;

sending, by the system administrator computing device, a second signal to the one or more electronic lock systems indicating registration of the proximity card;

processing, at the one or more electronic lock systems, the second signal and outputting a third signal containing registration data for the proximity card reader of the one or more electronic lock systems; and receiving, by the proximity card reader of the one or more electronic lock systems, the third signal to update the proximity card reader with the registration data to activate at least one of the one or more electronic lock systems when the proximity card is brought within a predefined distance of the proximity card reader of the one or more electronic lock systems.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

A further understanding of the nature and advantages of the various embodiments described herein may be realized by reference to the following drawings accompanied by the detailed description. In the appended figures, similar components or features may have the same reference label.

Figure 1:
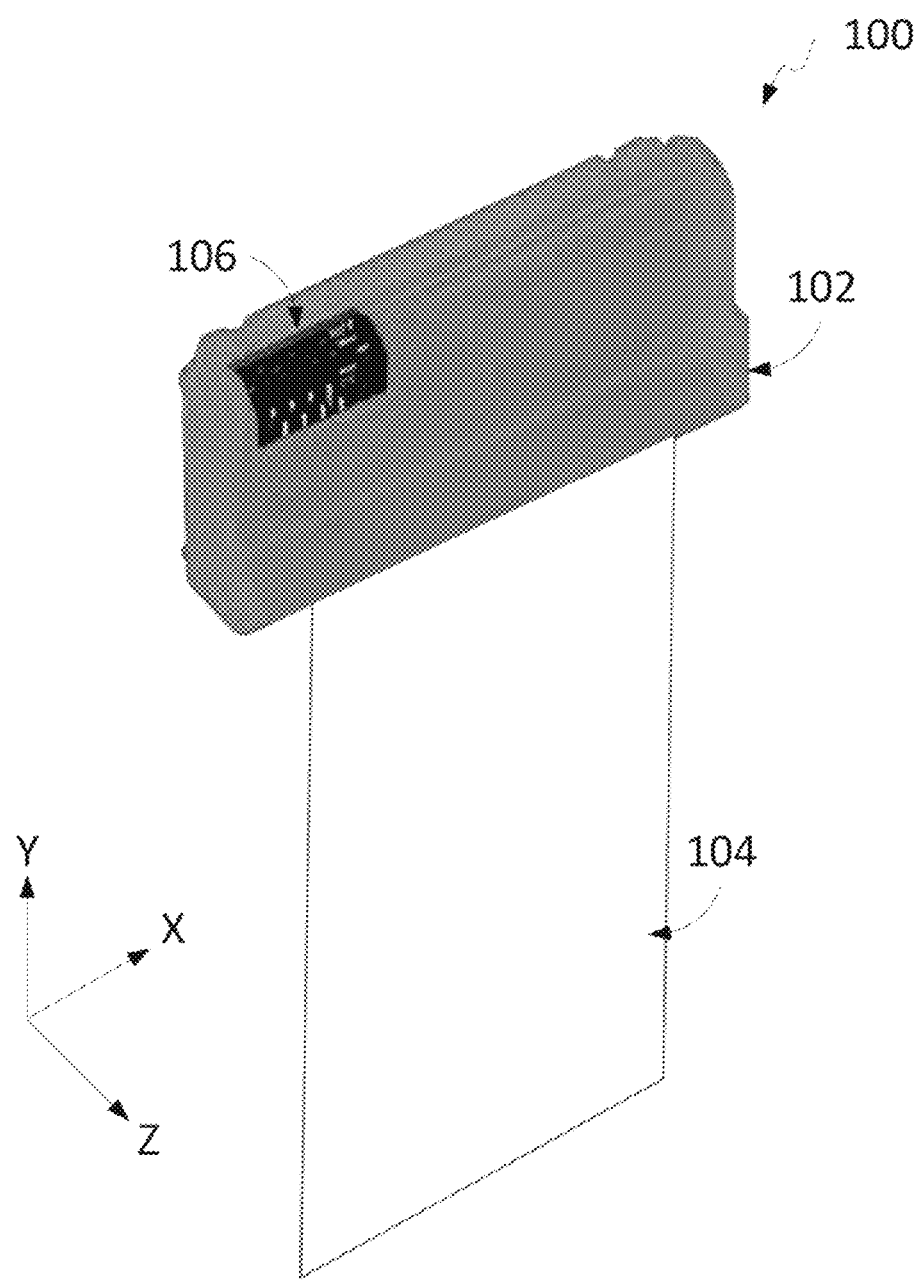
FIG. 1 is a perspective view of an exemplary lock module for use in an electronic lock system in accordance with exemplary embodiments of the disclosure, wherein the lock module includes a housing and a touchpad subsystem connected to the housing.

A Cartesian coordinate system is provided for ease of reference. As used herein, the width, height, and depth of the components shown in the figures correspond to the x, y, and z-directions, respectively.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein are interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order to not unnecessarily obscure various aspects of the present disclosure. Further, it will be appreciated that embodiments of the present disclosure may employ any combination of features described herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Disclosed herein are exemplary embodiments of a lock module that can be attached to an electronic or electromagnetic lock, which, in some embodiments, has already been installed on a door or other lockable structure. The lock module may be configured to provide remote access to the lock for controlling the lock (e.g., locking and/or unlocking the lock, programming the lock, etc.). The lock module may further be configured to provide additional features that the lock may in its initial installment be missing, such as a biometric sensor, an ambient sensor, an occupancy sensor, an RF sensor, a camera, a microphone, Bluetooth, central management, and/or mesh networking. Because the lock module can be attached to the lock, certain components of the lock module are referred to as "module" components, while certain components of the lock are referred to as "host" components.

Further disclosed is an electronic lock system having at least one lock with a lock module in accordance with exemplary embodiments of the present disclosure. The lock module of the at least one lock may be networked with other lock modules and/or a remote server for controlling the lock module. In that regard, the information collected by the lock module can be sent to a server for processing and/or review by an administrator. The administrator and/or stored instructions on the server can also remotely lock, unlock, and program the lock by communicating with the lock module. Multiple lock modules can form a mesh network that allows information to be passed between lock modules and on to a common gateway and server, thereby allowing many locks to communicate with each other (i.e., lock to lock to lock) and to reach a networked gateway.

Among other advantages, the lock module can be managed without the recurring costs that are associated with some SaaS solutions. For instance, the lock module may be used by a third party installer or vendor to enhance an OEM (original equipment manufacturing) lock and incorporate a new or existing access control solution to manage the OEM lock (formerly restricted to a SaaS solution managed by the OEM). In addition, the need for multiple gateways is eliminated because multiple lock modules can form a secure mesh network such that if at least one lock module is connected to a gateway, all of the multiple lock modules can communicate with the gateway by passing information within the mesh network. Connecting lock modules to a common gateway through a mesh network can also allow for power conservation (e.g., battery conservation) of the lock modules and/or locks since the at least one lock module connected to the gateway can route information to the other lock modules within the mesh network. As a result, the lock modules and/or locks can remain in a power-saving mode until receiving the information from the at least one lock module. As yet another advantage, the lock module does not change the UL and fire listing of the original OEM lock. These and other beneficial features will become apparent from the description that follows.

Figure 2B:
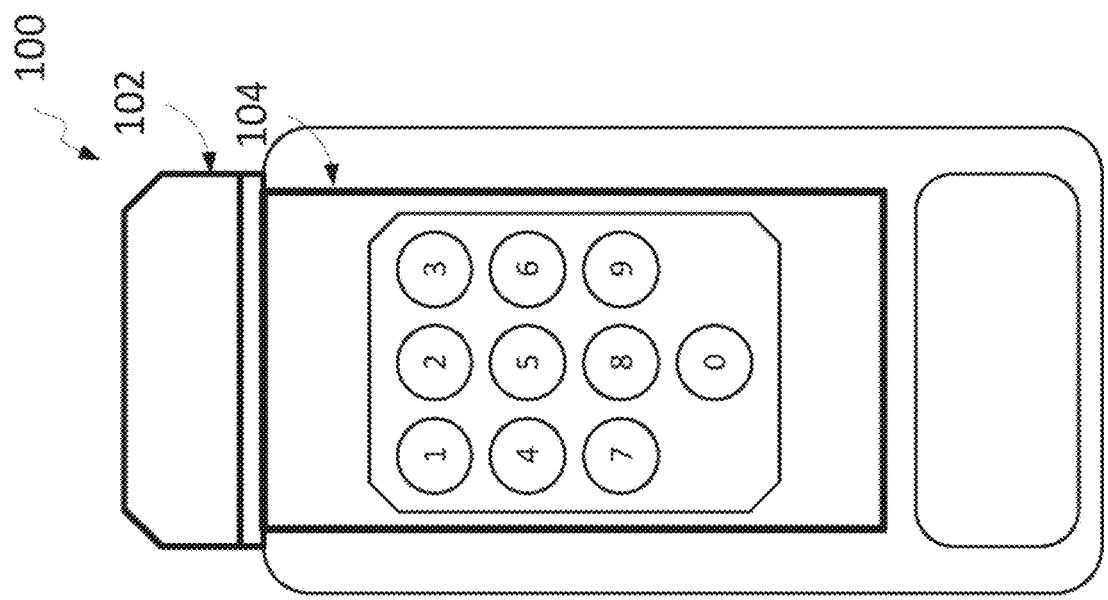
FIG. 2B is a front view of the lock module of FIG. 1 attached to the lock of FIG. 2A.

FIG. 1 is a perspective view of an exemplary embodiment of a lock module 100 for use with a lock configured to lock a lockable structure. Specifically, FIG. 1 depicts a "takeover" module that can be integrated with or otherwise internally disposed within an OEM lock, such as a lock in the Yale Assure family. Other lock modules may be configured as an add-on "Hat" lock module that will substantially match the overall design and finish of the lock but will be at least somewhat visible from the outside of the lock, as depicted in FIG. 2B.

In general, the exemplary embodiment of the lock module 100 includes a housing 102 and a touchpad subsystem 104 extending from the housing. The housing 102 houses electronic components for carrying out various functions of the lock module 100, as will be described below.

The touchpad subsystem 104 is made of one or more materials having electrical properties such that at least a portion of the touchpad subsystem can simulate the grounding of a touch-sensitive surface, e.g., a capacitive touchscreen. In one embodiment, the one or more materials of the touchpad subsystem 104 can be substantially transparent, such that when the touchpad subsystem, e.g., the surface that extends in the xy-plane, is placed over an underlying surface, the underlying surface can be viewed through the surface of the touchpad subsystem.

The touchpad subsystem 104 is connected to the housing 102 such that separation of the touchpad subsystem from the housing by an entity other than the manufacturer may result in damage to one or both components to deactivate the lock module 100 (and in some instances, the lock). For example, the touchpad subsystem 104 can be connected to the housing 102 using an adhesive or a weld. In one embodiment, the lock module 100 (and/or the lock) may be deactivated by the severance of an electrical connection between the touchpad subsystem 104 and electrical components within the housing 102.

Figure 2A:
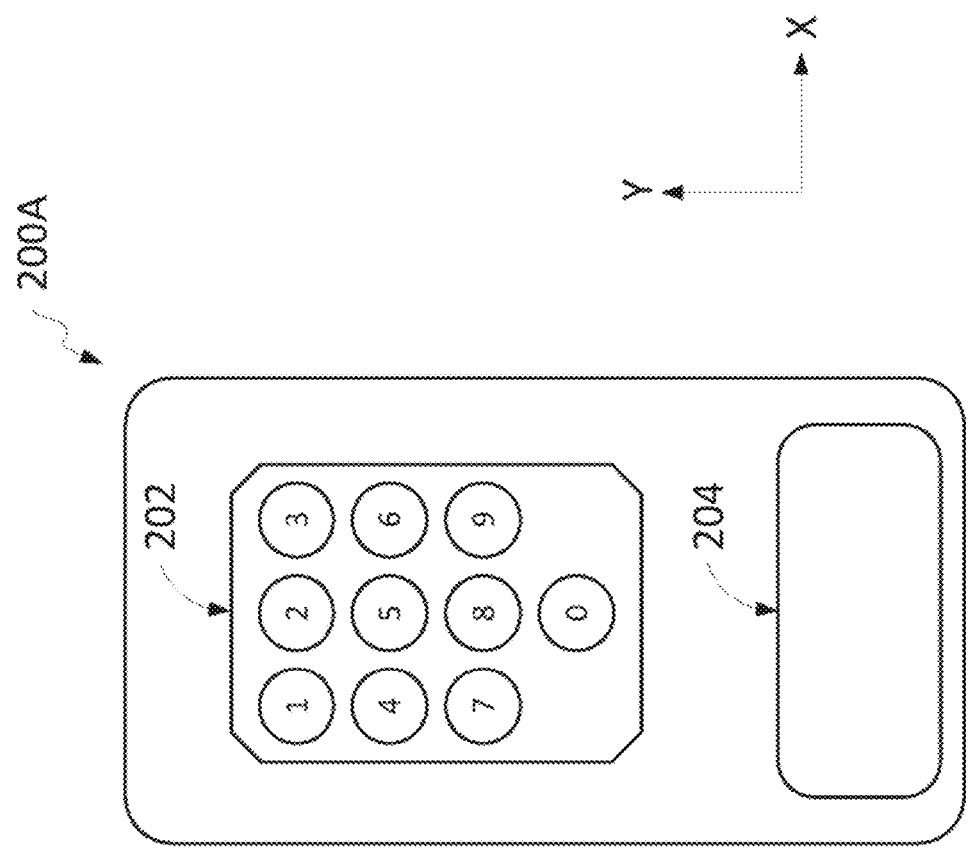
FIG. 2A is a front view of an exemplary lock for use in an electronic lock system in accordance with exemplary embodiments of the disclosure.

As noted above, the lock module 100 is configured to be attached to an electronic or electromagnetic lock for controlling aspects of the lock. FIG. 2A shows a front view of an exemplary electronic lock 200A for use with the lock module 100, while FIG. 2B shows a front view of the lock module 100 attached to the lock 200A. The exemplary lock 200A includes a touch-sensitive keypad 202 and an RFID reader 204. While not shown in FIG. 2A, the lock 200A can be attached to a lockable structure (e.g., a door), such that a code entered using the touch-sensitive keypad 202 or a programmed RFID key fob placed within operating distance of the RFID reader 204 can be used to unlock the lockable structure.

The lock 200A and the lock module 100 can be integrated into a single lock unit (e.g., they can be sold together), or the lock and lock module can be configured as individual, mix and match components combinable for a desired application (e.g., they can be sold separately). For example, the lock module 100 can be a component that is manufactured separately from the manufacturer of the lock 200A. In that regard, the lock module 100 described herein may be used with various different types of electronic and/or electromagnetic locks including, without limitation, the Yale Assurance lock family, the Schlage NDE lock, Latch locks such as Latch Series R/M/C Series, and the Dormakaba Nova-D lock. It should be appreciated that any suitable lock may be used, and as such, the descriptions and illustrations provided herein should not be seen as limiting.

Whether sold individually or as an integrated unit, the lock module 100 is configured for integration with the lock 200A or any other suitable lock. In that regard, the housing 102 may have a suitable size, shape, and configuration to attach to or otherwise mate with a correspondingly-shaped receptacle, opening, etc., in the lock 200A. Moreover, once mated, the lock module 100 may be secured to the lock 200A with a suitable connection assembly.

The connection assembly, not shown in detail, may include structure for (optionally removably) mating, securing, or otherwise attaching the lock module 100 to the lock 200A. The phrase "connection assembly", as used herein, may include a suitable interface, module mechanism, hardware, etc., that facilitates an entity other than the OEM of the lock to securely attach the lock module 100 to the lock 200A. For example, a user may attach the lock module 100 to the lock 200A using hardware, such as screws provided by the manufacturer of the lock module.

When the lock module 100 is attached to the lock using hardware, the hardware can be substantially hidden from view, e.g., to prevent unwanted or unauthorized removal of the module system from the lock. In addition or in the alternative, a portion of the lock module 100 may be snap-fit, press fit, adhered (e.g., using an adhesive tape), or otherwise mated with a correspondingly-shaped receptacle in the lock 200A in a suitable manner that substantially prevents tampering of the mated components. Moreover, in some instances, the lock module 100 will replace an existing (e.g., OEM) communications module within the OEM lock, in which case the back cover or another portion of the lock may be modified to accommodate any sensors or other components of the lock module 100.

In some embodiments, the touchpad subsystem 104 of the lock module 100 is configured to overlay the touch-sensitive keypad 202 of the lock 200A. For instance, the x and y dimensions of the touchpad subsystem 104 may be chosen such that the surface of the touchpad subsystem 104 substantially covers the surface of the touch-sensitive keypad 202 when the lock module 100 is attached to the lock 200A, as shown in FIG. 2B. A suitable adhesive or the like may be used to securely attach the touchpad subsystem 104 of the lock module 100 to the touch-sensitive keypad 202 of the lock 200A to prevent any shifting therebetween. This overlay may also incorporate an inconspicuous RF antenna for added Bluetooth, WiFi, or other RF capabilities to the lock 200A for reading credentials.

The electrical properties of the touchpad subsystem 104 may be configured to simulate a human user touching any of the multiple touch-sensitive buttons of the keypad 202 of the lock 200A. For example, one or more electrical signals can be used to change the electrical properties of certain portions of the touchpad subsystem 104, e.g., making the certain portions of the touchpad subsystem 104 conductive. The certain portions of the touchpad subsystem 104 can overlap substantially with certain touch-sensitive buttons of the keypad 202, therefore simulating a human user touching the certain touch sensitive buttons, e.g., by grounding the certain touch sensitive buttons. The one or more signals used to change the electrical properties of the certain portions of the touchpad subsystem 104 can be generated by electronic components housed by the housing 102.

Moreover, with the touchpad subsystem 104 optionally being substantially transparent, as noted above, the touch-sensitive keypad 202 of the lock 200A is visible when covered by the touchpad subsystem 104. Therefore, the keypad 202 of the lock 200A can be viewed and the touch-sensitive buttons of the keypad can be used when the lock module 100 is attached to the lock 200A. In that regard, the touchpad subsystem 104 can be made from any material or combination of materials that allow an underlying surface to be viewed through the touchpad subsystem, while also having the electrical properties described above. For example, the touchpad subsystem 104 can be made from a substantially transparent substrate onto which a conductive material is deposited. In some implementations, the touchpad subsystem 104 can include indium tin oxide (ITO), e.g., ITO can be deposited on the substantially transparent substrate. In some implementations, the conductive material can have x and y-dimensions that are small enough so as to be substantially invisible to a human interacting with the touchpad subsystem 104.

It should be appreciated that the touchpad subsystem 104 may be modified to cover and interface with any suitable input assembly of a different type of lock. Moreover, in some embodiments, the lock module 100 may attach to a lock that does not have a touch sensitive keypad. In such embodiments, the lock module 100 may itself include a touch-sensitive keypad or similar attachment to add the features and abilities of a keypad where one did not originally exist.

Figure 3A:
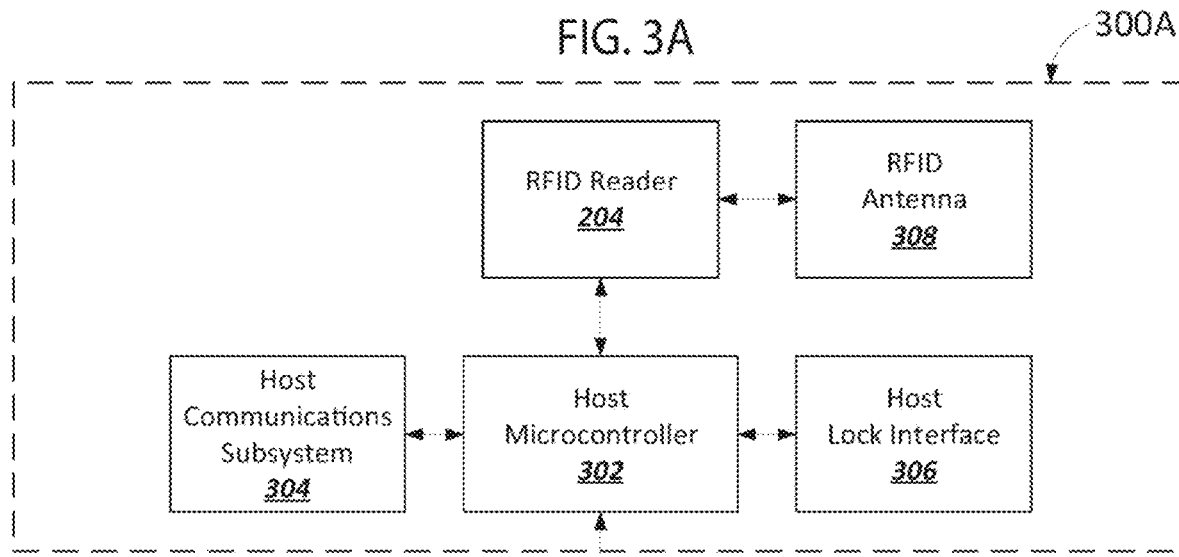
FIG. 3A is a block diagram of exemplary lock components of the lock of FIG. 2A.
Figure 3B:
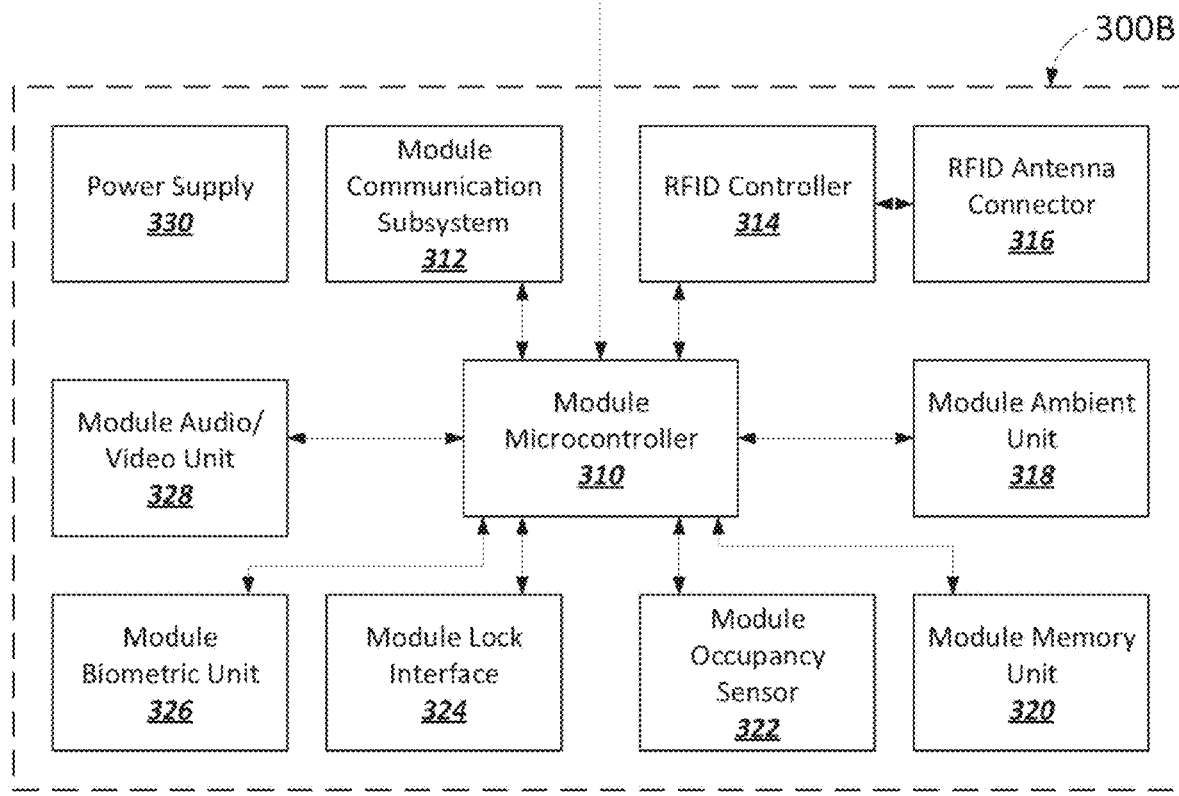
FIG. 3B is a block diagram of exemplary lock module components of the lock module of FIG. 1.

Referring to FIGS. 3A and 3B, exemplary electronic components of the lock module 100 and the lock 200A will now be described. FIG. 3A shows a block diagram of exemplary lock components 300A, or simply host components of the lock 200A, and FIG. 3B shows a block diagram of exemplary lock module components 300B, or simply module components of the lock module 100 (for instance, enclosed within the housing 102).

In general, the host components 300A may be representative of an OEM's internal equipment. In that regard, it should be appreciated that the host components 300A may include more or less than what is shown and described without departing from the scope of the present disclosure.

Referring to FIG. 3A, in the depicted exemplary embodiment, the host components 300A may include a host microcontroller 302 communicatively connected to a host communications subsystem 304 and a host lock interface 306. The host microcontroller 302 sends and receives signals to and from the host components to which it is coupled, e.g., to control certain functions of the components. The host communications subsystem 304 can enable the lock 200A to communicate with other electronic devices, e.g., through WiFi, Bluetooth, Smart cards, etc. The host lock interface 306 can include suitable components for locking or unlocking the lockable structure. For instance, the host lock interface 306 can include a host stepper motor and a host limit switch (not shown), which are activated by the host microcontroller 302 (in response to a signal received by the host communications subsystem 304, for instance) to actuate the locking components of the lockable structure.

The host components 300A may also include the RFID reader 204 referenced above, which is communicatively coupled to an RFID antenna 308, enabling the host lock interface 306 to be unlocked using an RFID key fob. In other examples, the host components 300A may include components for enabling the host lock interface 306 to be unlocked using keypad entry or wireless communications. The host components 300A may also include a touch display with digits, biometrics, camera, Bluetooth, etc., which are not shown in FIG. 2A. For instance, certain locks may simply include RF proximity card (or prox card) and wireless communications, whereas other locks (such as Latch locks) may include most or all of the host components 300A described herein, including an imbedded camera.

Referring additionally to FIG. 3B, the host microcontroller 302 can be communicatively coupled to a module microcontroller 310 of the module components 300B, for example, by an electrical or wireless connection established when the lock module 100 is attached to the lock 200A. The communicative coupling between the host microcontroller 302 and the module microcontroller 310 can allow the module microcontroller 310 to send and receive signals to and from the host components 300A, e.g., such that the host microcontroller 302 acts as an intermediary between the module microcontroller and the host components 300A. For example, the module microcontroller 310 can unlock the lock 200A by sending a signal to the host microcontroller 302, which then sends an appropriate unlock signal to the host lock interface 306. As a specific example, the module microcontroller 310 can control one or more electrical components of the lock 200A (such as a stepper motor or signal generator of the lock 200A) by sending and receiving signals to and from the host microcontroller 302. The module microcontroller 310 can also be configured to override the host microcontroller 302 to directly control the host components 300A.

The module microcontroller 310 is communicatively coupled to a module communication subsystem 312, e.g., through a universal asynchronous receiver-transmitter interface, or UART interface. The module communication subsystem 312 is configured to communicatively connect the lock module 100 to other lock modules, forming a network of lock modules, e.g., a mesh network. For example, the module communication subsystem 312 can act as a Z-wave communication node, while the respective communication subsystems of other lock modules can form a Z-wave mesh network. In some embodiments, instead of or in addition to communicating using Z-wave, the communication subsystem 312 can communicate and/or form a mesh network using ZigBee, Bluetooth, Cellular, or WiFi.

The module components 300B can also include an RFID controller 314 and an RFID antenna connector 316 communicatively coupled to the module microcontroller 310 through a serial peripheral interface, or SPI. When the lock module 100 is attached to lock 200A, the RFID antenna connector 316 can be a positioned such that it can send and receive signals to and from the RFID antenna 308 of the lock 200A. Such data can be dynamically controlled from a central server to act as if a physical person is there to present an admin card, password, programming data, etc. For example, the RFID antenna connector 316 can be a radio frequency overlay, replicating a physical wire that sends radio frequency signals to the RFID antenna 308.

The module components 300B can also include one or more subsystems or sensors that determine conditions of the environment of the lock module 100 (and/or the lock 200A). For example, the module components may include a module ambient unit 318. The module ambient unit 318 can include one or more of a temperature sensor, a humidity sensor, and a light sensor. The one or more sensors of the module ambient unit 318 can generate ambient data that corresponds to the ambient conditions of the lock module 100. For example, if the lock module 100 is attached to a lock that is located within a hotel room, the ambient data can include one or more of a temperature, a humidity, or an intensity of light of the room. This ambient data can then be used to control the room through a BMCS (Building Management Control System) to control power consumption, HVAC, etc.

The lock module 100 can communicate the ambient data to a server. For example, the ambient data can be communicated from the module ambient unit 318 to the module microcontroller 310, thereafter to the module communications subsystem 312, and then on to the server. The lock module 100 can collect and send ambient data in real time, or close to real time. In some implementations, the ambient data can be collected by a module memory unit 320, which collects the data for a certain time period before the data is transferred to a server. For example, the module memory unit 320 can collect data over the course of a day and the module communication subsystem 312 can transfer the collected data to a server once per day or at multiple times per day at defined intervals to conserve power. In one embodiment, the module microcontroller 310 can be communicatively coupled to the module memory unit 320 through an I2C interface.

The software running on the server can use the ambient data to monitor or adjust ambient conditions at or around the location of the lock module 100. For example, if a lock module 100 is located within an office building, the software running on the server can use temperature sensor data received from the lock module to adjust the temperature of a room or hallway of the office building. As another example, if the lock module 100 is located within a school, the software running on the server can use the light sensor data to turn on/off lights in a classroom or hallway. As yet another example, if the lock module 100 is located within a greenhouse, the software running on the server can use humidity sensor data to adjust the humidity with the greenhouse.

In addition to ambient data, the lock module 100 can also take still images or videos of the environment of the lock module. For example, the module components can include a module audio/video unit 328, which can be positioned such that it is able to collect audio and/or visual data of the environment of the lock module 100, e.g., by collecting audio, images, or videos of a person within operating distance to the lock module. The audio and/or visual data can be transferred to a server or collected by the module memory unit 320 before being transferred to a server.

The conditions of the environment of the lock module 100 can include occupancy data generated by a module occupancy sensor 322. For example, the module occupancy sensor 322 can be a motion sensor and the occupancy data can include information corresponding to whether a room or hallway within the environment of the lock module 100 is occupied, e.g., based on the module occupancy sensor detecting motion. The occupancy data can be transferred to a server or collected by the module memory unit 320 before being transferred to a server, and the server can use the occupancy data in adjusting certain ambient conditions. For example, software running on a server can adjust the ambient conditions such as temperature, humidity, or light, of an office building only if certain spaces of the office building are occupied, or the software can be used to notify management of an occupied room.

Not only can the module memory unit 320 store data related to the environment of the lock module 100, it can also store data related to access codes. For example, an administrator of one or more lock modules can add or remove access codes that can be used to unlock the lock 200A. The access codes can be stored locally, e.g., in an encrypted format, in the module memory unit 320. In one implementation, an administrator can set an access code such that it is individual to a lock module. In such an instance, an access code that unlocks a first lock attached to a first lock module does not unlock a second lock attached to a second lock module. An administrator can also set a master access code that can be used to unlock some or all of the respective locks attached to lock modules within a mesh network of lock modules. Access codes can also be controlled via days and times, meaning they will only work during specific times defined by the administrator. Access codes can also be shared and incorporated into the traditional wired access control doors and system. Further, access codes can also be prox or smart cards, such as Wiegand or Desfire EV1/2/Classic, etc., instead of a code.

The module components 300B can be powered by a module power supply 330 of the lock module 100. For example, the power supply can include one or more batteries. Alternatively or in addition to receiving power from the power supply, one or more of the module components 300B can be powered by an external power supply, e.g., one that powers electrical components of the building or space in which the lock module 100 is located (such as through port 106). In other implementations, the module components 300B of the lock module 100 can receive power from the lock to which the lock module is connected (such as lock 200A).

Including a module power supply 330 at least as a redundant source of power can be advantageous because it can ensure that the lock module 100 has power even if the external power supply loses power. In some implementations, the module microcontroller 310 can approximate the remaining lifetime of the module power supply 330 and send data related to the lifetime of the power supply to a server. In yet the same or different implementations, a low-power alert can be sent to the server if the power supply lifetime drops below a certain threshold value.

In some implementations, the lock module 100 can include a low power monitoring unit that keeps the lock module in a sleep mode. For example, while in sleep mode one or more of the module components 300B, e.g., the module ambient unit 318, the module lock interface 324, the module biometric unit 326, and/or a module audio/video unit 328, are powered off and are powered on if motion is detected in the environment of the lock module 100 or if a signal is received by the module microcontroller 310 or the module communication subsystem 312.

In some embodiments, the lock module 100 can include a component that allows components of the lock module to be powered and/or charged using electromagnetic radiation such as visible light. For example, the outside surface of the housing 102 can include a flexible solar strip that can be used to generate an electric current from natural or artificial light in the environment of the lock module 100. The electric current can power one or more components of the lock module 100 and/or charge one or more batteries of the lock module.

As discussed above, the lock module 100 can include a touchpad subsystem 104 configured to overlay the touch-sensitive keypad 202 of lock 200A or a similar input assembly of a different type of lock. The module components 300B are configured to support the transfer of signals between the touchpad subsystem 104 and the lock 200A. For instance, the module microcontroller 310 can send a signal to the touchpad subsystem 104, the signal including information related to an access code that the touchpad subsystem 104 can input to the touch-sensitive keypad 202 of the lock 200A.

However, in some embodiments, the lock module 100 may attach to a lock that does not have a touch sensitive keypad. Accordingly, in some implementations, the module components 300B of the lock module 100 may include a module lock interface 324 that includes a touch-sensitive keypad into which access codes can be entered. For example, one or more of the access codes input to module lock interface 324 can be used to lock or unlock the lock to which the lock module 100 is attached. Therefore, the lock module 100 can include components that add to or replace components of a lock to which it is attached.

For example, an original lock may not have an RFID reader. As such, the module components can include an RFID reader, e.g., communicatively coupled to the RFID controller 314, so that the lock can be locked and unlocked by an RFID key. As another example, the module components 300B can include a module biometric unit 326. The module biometric unit 326, which can include one or more of a fingerprint scanner, a microphone for audio input, an iris or retina scanner, or a facial recognition engine, may provide additional methods to lock and unlock a lock to which the lock module 100 is attached. In some embodiments, the module biometric unit 326 may read or measure light, temperature, speed, electrical capacity, and other types of energies to gather biometric data. In some implementations, the module components can also include a proximity sensor, a smart card or proximity card reader, or other sensors (not shown).

In some implementations, the lock module 100 can omit one or more of the module components 300B described herein. For example if a lock includes a biometric unit, the module components can omit the module biometric unit 326 to avoid having redundant components. In that regard, it should be appreciated that any suitable combination of module and host components may be used for the intended application.

As can be appreciated from the foregoing, a single lock module 100 can be used to provide additional security and access to a single lock used to secure access to a building, room, safe, etc. However, some buildings or facilities, for instance, include multiple locks dispersed throughout the building or facility. Accordingly, it would be advantageous to form a network of multiple lock modules each attached to a different lock within the same management system (e.g., within the same building or facility).

Figure 4:
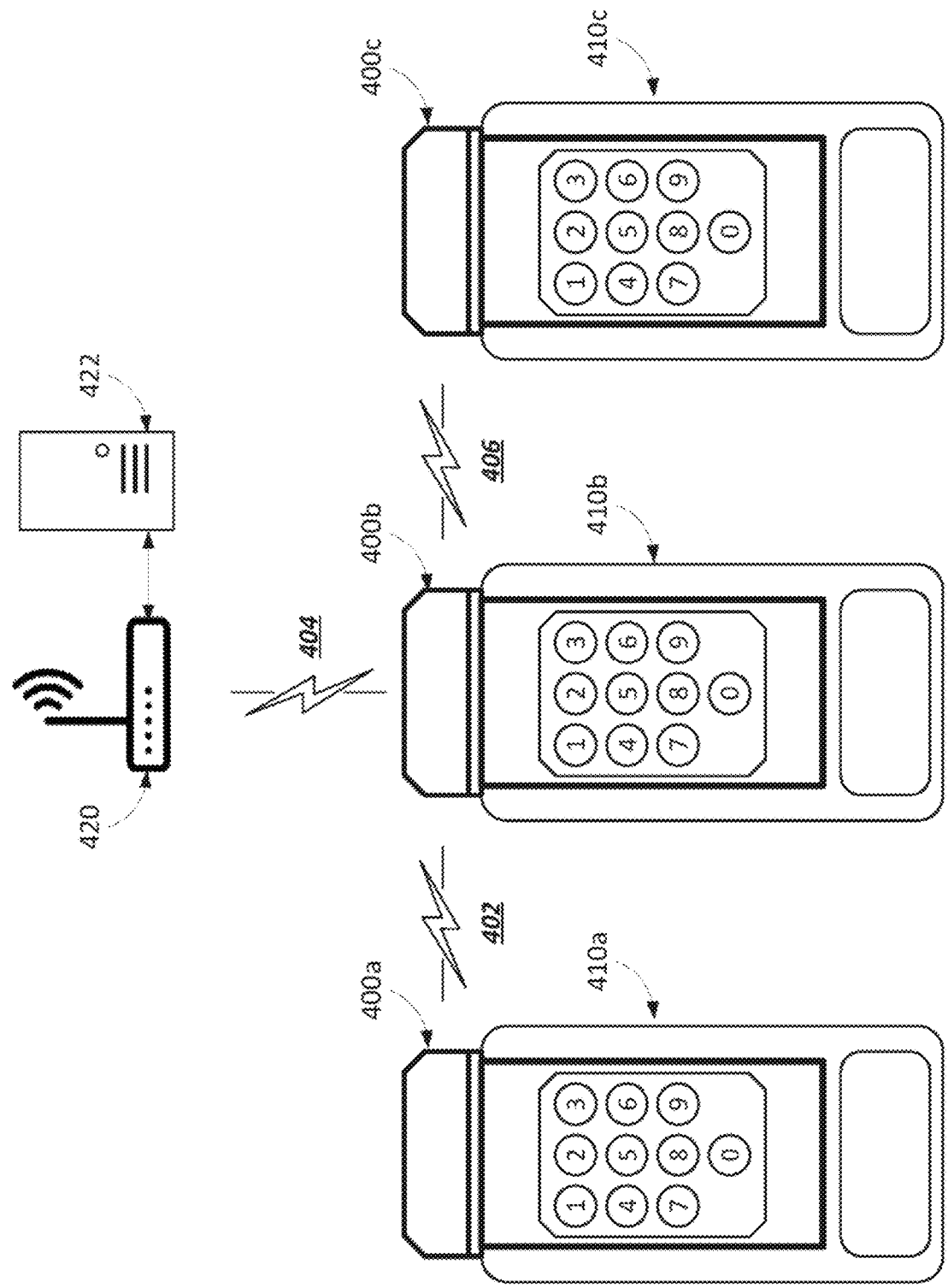
FIG. 4 is a diagram illustrating an electronic lock system having a network of three lock modules, each attached to a respective lock.

An example of such a network is shown in FIG. 4. More specifically, FIG. 4 depicts a diagram illustrating a network of three lock modules 400a-400c, each attached to a respective lock 410a-410c. The network further includes a gateway 420 configured to relay signals between the lock modules 400a-400c and a server 422 through a communicative coupling.

In that regard, the network further includes communications channels 402, 404, and 406, which allow for information to be sent and received between the lock modules and the gateway 420. For example, communication channel 402 communicatively connects communication subsystems (such communication subsystems 304 and 312 shown in FIGS. 3A and 3B) of lock modules 400a and 400b, and communication channel 406 communicatively connects communication subsystems of lock modules 400b and 400c. Communication channel 404 communicatively couples the lock module 400b to the gateway 420, which is communicatively coupled to the server 422.

As can be appreciated, the lock modules 400a-400c can form a mesh network, e.g., a Z-wave mesh network, such that each of the lock modules 400a-400c is a node along the network. The mesh network eliminates the need for a communication channel between each of the lock modules 400a-400c in the network, or between each of the lock modules 400a-400c and the gateway 420.

For example, although the lock module 400a is not directly communicatively coupled to the gateway 420, the lock module 400a can send data to the lock module 400b, e.g., using the Z-wave or ZigBee, WiFi, cellular, or Bluetooth protocol. The lock module 400b, being communicatively coupled to the gateway 420 by the communication channel 404, can receive the data from the lock module 400a and send the data to the server 422 by communicating the data to the gateway 420. In this way, each lock module that forms a node of the mesh network can send and receive information to the server 422.

As another example, although the lock module 400a is not directly communicatively coupled to the lock module 400c, the lock module 400a can send data to the lock module 400c, by first sending the data to the lock module 400b, which then sends the data to the lock module 400c. In this way, each lock module that forms a node of the mesh network can send and receive data to the other lock modules of the mesh network.

Another advantage of the mesh network is that when a lock module is added to the mesh network, it does not need to be directly communicatively coupled to the gateway 420. This is advantageous if the gateway 420 is located out of range of the newly added lock module.

The gateway 420 can be powered using power over Ethernet (POE) using a connection to a utility power grid, or using another source now known or later developed. Gateway 420 can maintain a wired or wireless connection to the server 422 via TCP/IP network. Multiple gateways (such as gateways identical or similar to the gateway 420) can be electrically connected in series using a single wire (e.g., a Cath cable), and the gateways can be powered using POE (e.g., POE++). Such a multiple gateway configuration beneficially results in limited physical deployment and wiring requirements during installation and upgrades. The server 422 can be accessed by an administrator using an interface, e.g., a graphical user interface, or GUI presented for display on a web browser, a visual display such as a display screen, an audio device such as a speaker, and various input devices such as a keyboard, touch-screen, microphone, or the like. In some embodiments, the interface may communicate with a remote or external device through an I/O controller.

The server 422 can be one of multiple cloud-based, remote computing devices. In such an arrangement, the administrator can use the interface to remotely perform certain actions or updates to one or more lock modules. For example, the administrator can unlock or lock a lock to which a lock module is attached through the interface. In some implementations, the server is located on-site, e.g., in or around a building where one or more lock modules are located.

As another example, the administrator can use the interface to program a key fob used to unlock the lock, e.g., using the RFID reader of the lock or an RFID reader of the lock module. This can eliminate the need for a catch-all reader for programming and can eliminate the need for a programming card and/or a delete card as may be used with certain locks.

As yet another example, the administrator can add and/or remove access codes that can be used to lock or unlock a lock to which a lock module is attached.

In some implementations, the server 422 can receive environmental data such as ambient data or occupancy data, which the administrator can view using the interface.

In some implementations, an administrator can set certain access timeframes according to a lock module. For example, the administrator can program a lock module to only unlock a lock during a certain time of the day or a certain day of the week. The host components 300A can vary depending on the lock 200A, e.g., the make and model of the lock. For example, while FIG. 2A shows a lock 200A that includes both the touch-sensitive keypad 202 and the RFID reader 204, in some implementations, a lock can include either a touch-sensitive keypad or an RFID reader.

In some implementations, a lock can additionally include one or more of a host biometric sensor, a host occupancy sensor, a host ambient sensor, a host camera, and a host memory unit. The module microcontroller 310 can be configured to send and receive data to and from the additional host components, e.g., using its communicative coupling with the host microcontroller 302, which in turn can be communicatively coupled to the additional host components.

Figure 5:
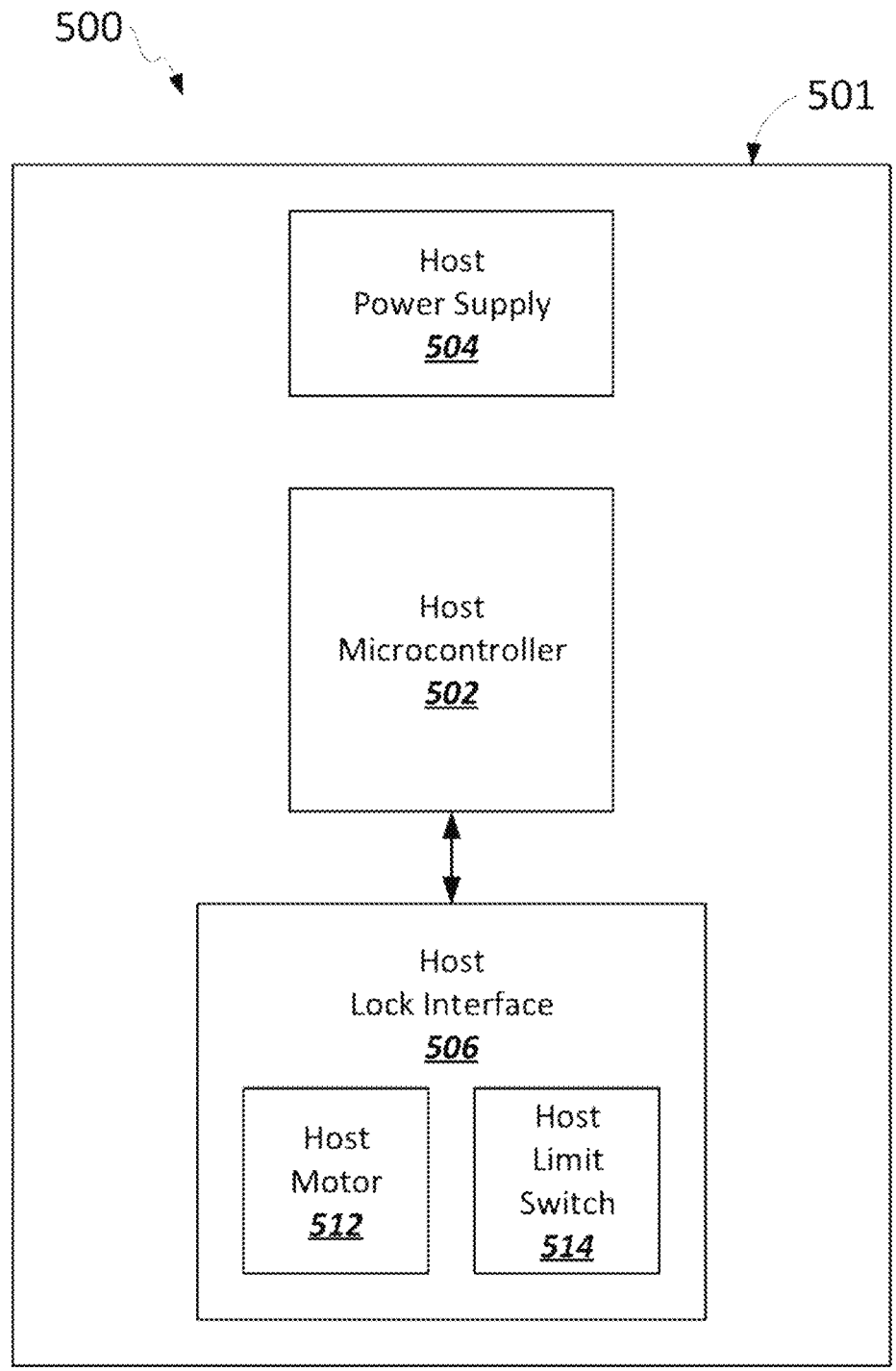
FIG. 5 is a block diagram of an electronic lock system that includes a first set of electronic components.
Figure 6A:
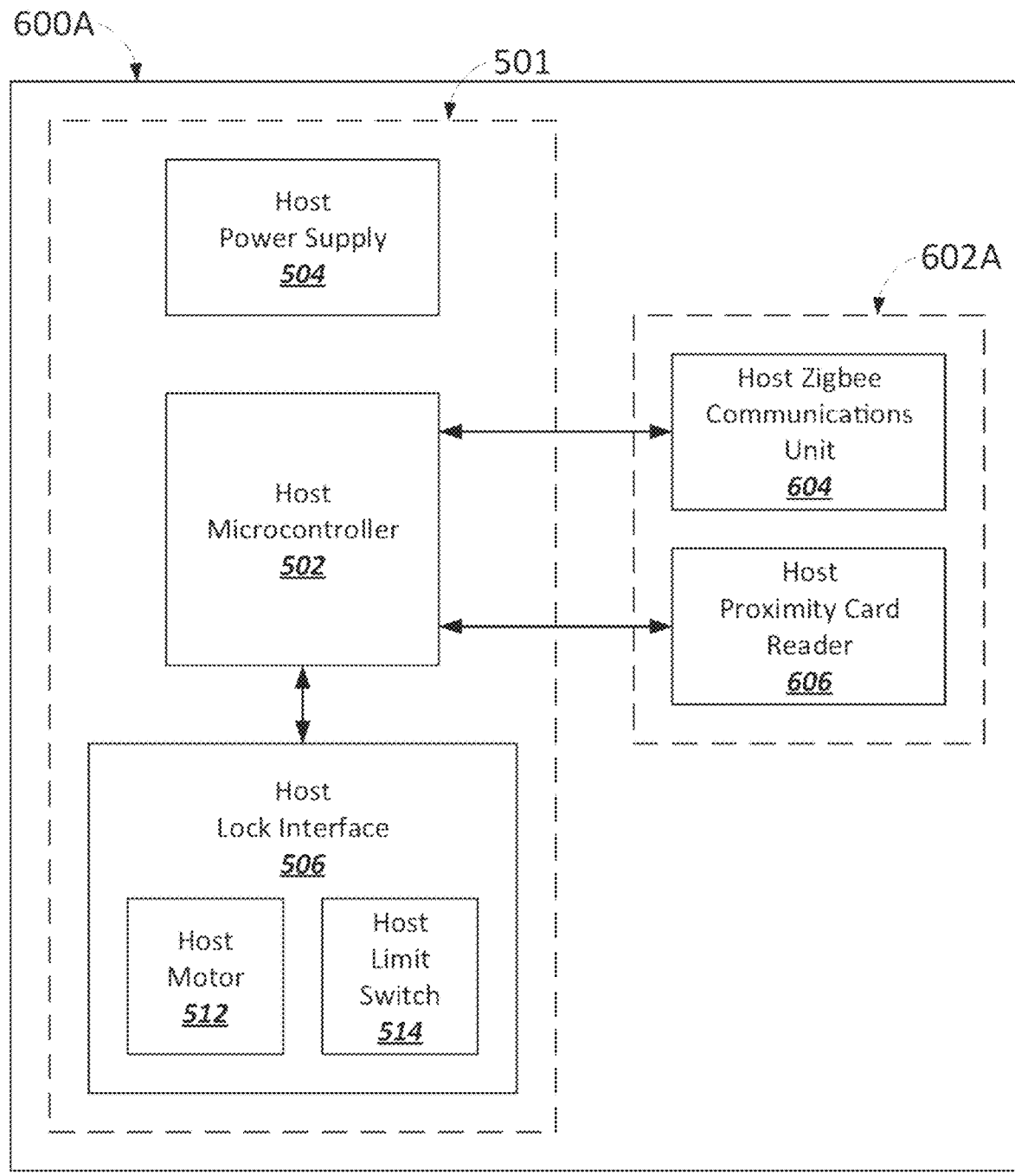
FIG. 6A is a block diagram of an electronic lock system that includes the first set of electronic components with the addition of a second set of electronic components.
Figure 6B:
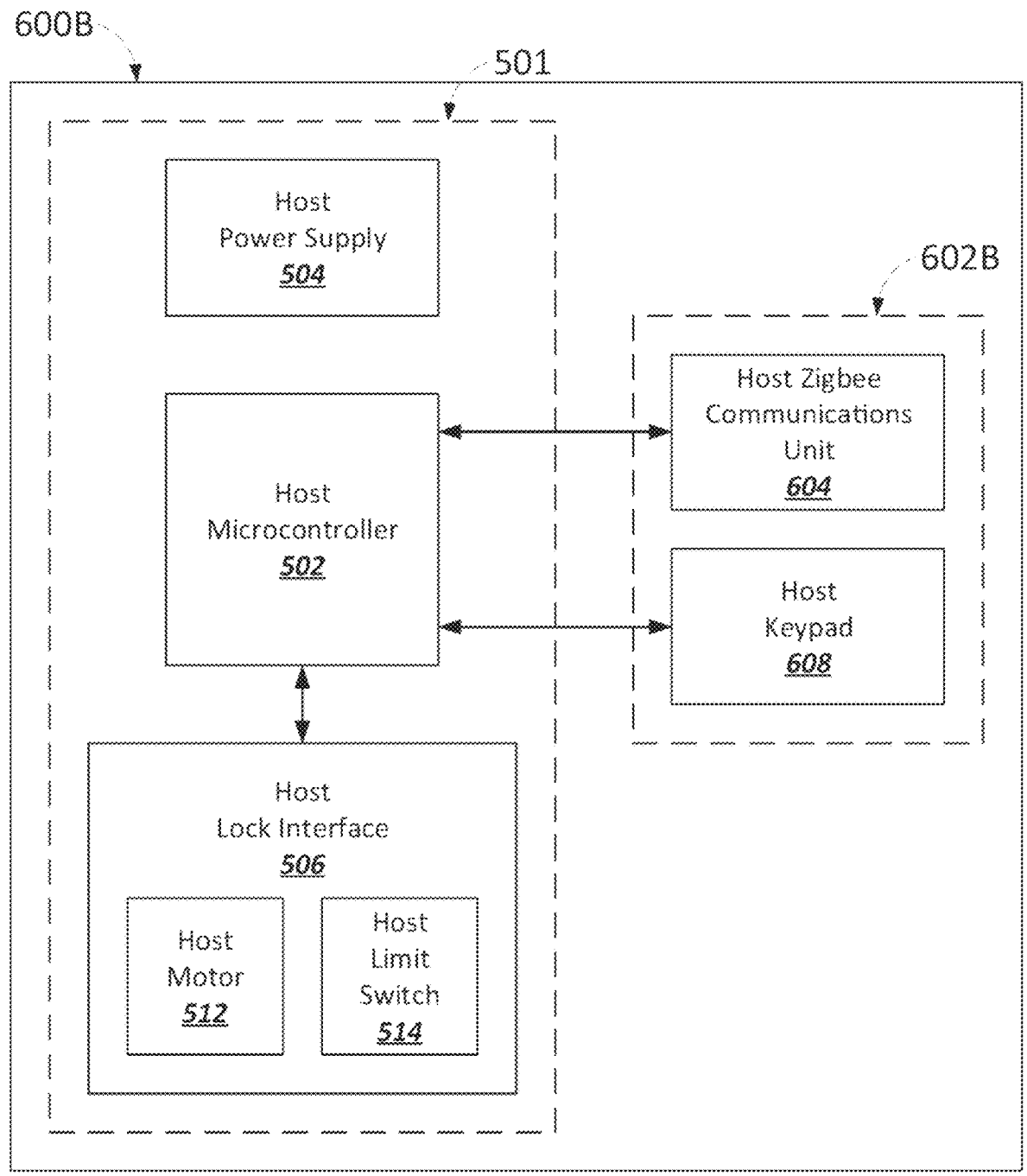
FIG. 6B is a block diagram of an electronic lock system that includes the first set of electronic components with the addition of a third set of electronic components.
Figure 6C:
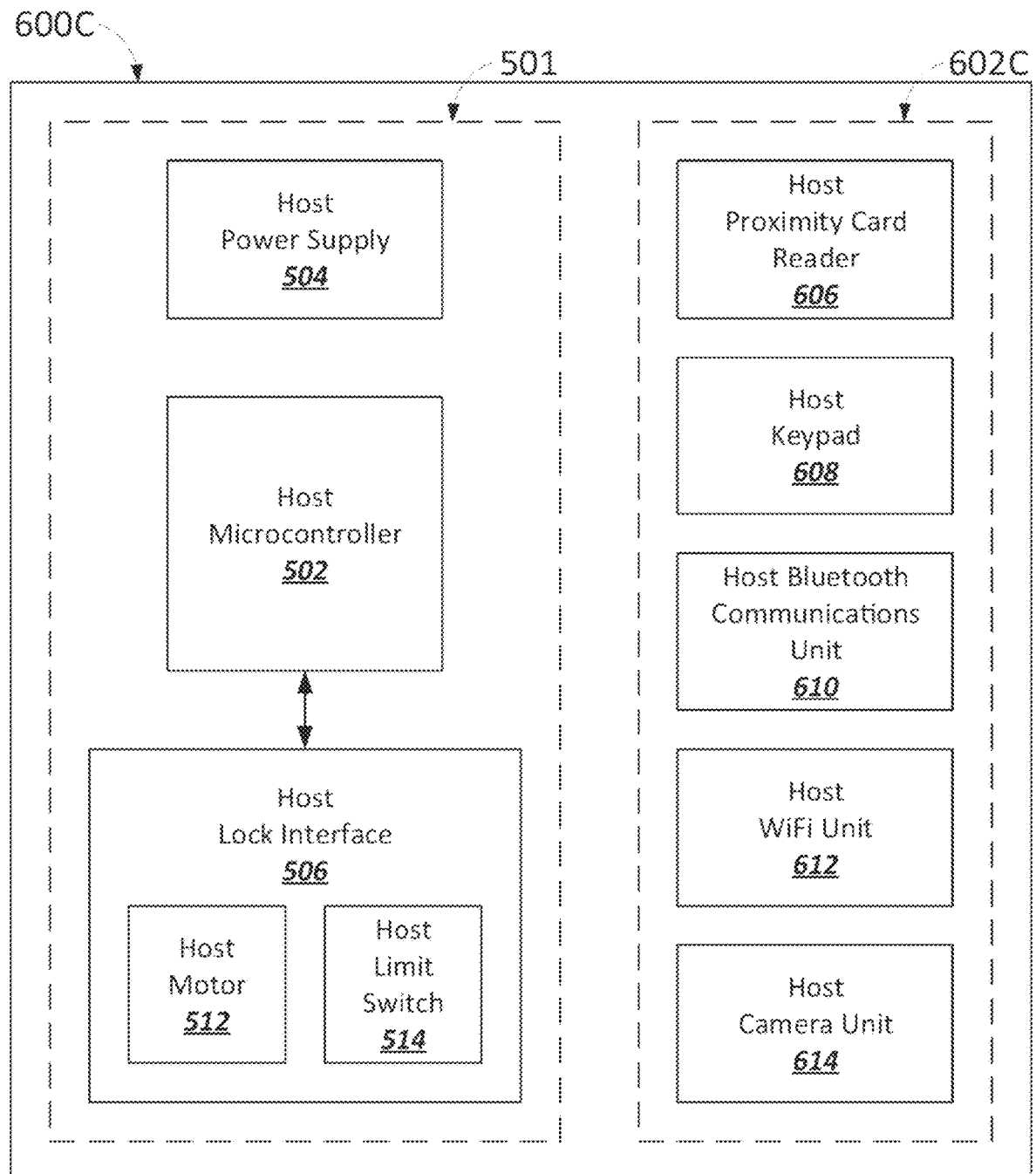
FIG. 6C is a block diagram of an electronic lock system that includes the first set of electronic components with the addition of a fourth set of electronic components.

FIGS. 5-6C depict various electronic lock systems 500 and 600A-600C with which the described exemplary lock modules can interface. In that regard, the electronic lock systems 500 and 600A-600C shown in FIGS. 5-6C each include a unique set of electronic components. On their own, the electronic lock systems 500 and 600A-600C provide one or more functionalities. However, adding a lock module, such as the lock module 100, increases or alters the range of functionalities that the electronic lock system alone can perform.

Referring to FIG. 5, a block diagram of an electronic lock system 500 includes a first set of electronic components 501. The first set of electronic components 501 include a host power supply 504, a host microcontroller 502, and a host lock interface 506. While omitted from FIGS. 5-6C for simplicity, it should be understood that the different electronic lock systems of FIGS. 5-6C can each include one or more of the host components 300A shown in FIG. 3A. In that regard, similar parts are labeled with identical reference numbers except in the 500 series. For instance, the host microcontroller 502 and host lock interface 506 may be substantially identical to the host microcontroller 302 and host lock interface 506 described above except for any differences described or shown herein.

The host microcontroller 502 and the components to which it is communicatively coupled, such as the host lock interface 506, are powered by the host power supply 504, which can include a housing and one or more batteries that are enclosed by the housing. For example, the host power supply 504 can include two or more batteries, three or more batteries, or four or more batteries. The batteries can be 1.2 V or 1.5 V batteries, or have a voltage in a range between 1.2 V and 1.5 V. For example, the batteries can be AA batteries.

The host lock interface 506 includes a host motor 512 and a host limit switch 514, which together can be used to actuate the locking components of the host lock interface.

For example, the locking components can include a deadbolt or latch bolt. The host limit switch 514 can be used to determine the position of the deadbolt or latch bolt (e.g., whether they are in a locked or unlocked position, such that the door to which the host lock interface 506 is locked or unlocked, respectively). The host motor 512 can actuate one or both of the deadbolt and latch bolt to set these components to the engaged or disengaged positions.

A lock module, such as the lock module 100, can be communicatively and/or physically coupled to the electronic lock system 500 such that the lock module can control the components of the electronic lock system. For example, the following operations can be performed to communicatively and/or physically couple a lock module to the electronic lock system 500. One or more wires can connect the host power supply 504 to other components of the electronic lock system 500, such as the host microcontroller 502. Thus, one step of coupling a lock module to the electronic lock system 500 includes disconnecting the one or more wires connected to the host power supply 504.

In another step, the host power supply 504 can be connected (through one or more wires and/or connectors) to one or more module components to power the one or more module components, such as one or more of the module components 300B. As shown in FIG. 3, the module components 300B include the module power supply 330, which can be omitted from the module components when drawing power from the host power supply 504. In some implementations, the module components 300B include the module power supply 330, which powers one or more of the module components 300B, while the host power supply 504 powers one or more other components of the module components 300B.

Another step of coupling a lock module to the electronic lock system 500 includes connecting the module housing, that is, the housing of the lock module (e.g., the housing 102) to the electronic lock system 500. For example, the housing of the lock module can be secured to an exterior portion of a lock housing for the electronic lock system 500. In other implementations, the module housing is disposed at least partially within the lock housing. For example, the lock housing can include one or more covers that can be removed to expose an interior cavity that (optionally removably) receives the lock housing. In some implementations, the lock module can include a housing that replaces a portion of the lock housing that is removed to expose an interior cavity of the electronic lock system 500, such as a cover or insert.

Certain components of the lock module 100 can reside inside the electronic lock system 500, while other components can reside on the exterior of the lock system. For example, the module microcontroller of the lock module 100 can reside inside the electronic lock system, while an antenna of the lock module 100 (e.g., the RFID antenna connector 316) can reside on the exterior of the lock system.

In one embodiment, one of the module components, such as the module microcontroller 310, can control the host lock interface 506. For example, the module microcontroller 310 can communicate with the host limit switch 514 to determine the position of the locking components (e.g., whether they are in the locked or unlocked position). The module microcontroller 310 can selectively power the host motor 512 to change the position of the locking components. In that regard, the module microcontroller 310 can override the host microcontroller 502.

The electronic lock system 500 can provide certain functionality, such as logging when the locking components of the lock system change between the locked and unlocked positions. However, the combination of the lock module 100 and the electronic lock system 500 can achieve additional functionality, resulting in an improvement in the electronic lock system 500. For example, adding the lock module 100 to the electronic lock system 500 can enable one or more of the functionalities described with respect to the module components 300B. As an additional example, the lock module 100 can add RFID capabilities (e.g., using the RFID controller 314 and the RFID antenna connector 316), ambient environment sensing (e.g., using the module ambient unit 318), occupancy sensing (e.g., using the module occupancy sensor 322), biometric sensing (e.g., using the module biometric unit 326), and surveillance capabilities (e.g., using the module audio/video unit 328).

FIG. 6A is a block diagram of an alternate embodiment of an electronic lock system 600A suitable for use with a lock module, such as the lock module 100. The electronic lock system 600A includes the first set of electronic components 501, with the addition of a second set of electronic components 602, which includes a host Zigbee communications unit 604 and a host proximity card reader 606.

While the electronic lock system 600A supports Zigbee communications and proximity card entry, a lock module, such as the lock module 100 can connect to the electronic lock system 600A to enable additional functionalities, such as one or more of the functionalities described with respect to the module components 300B. Communicatively and physically coupling the lock module 100 to the electronic lock system 600A can be performed by following a procedure similar to the one described with respect to the electronic lock system 500.

While FIGS. 3A-3B show an indirect coupling between the module microcontroller 310 and the host lock interface 306 (e.g., the module microcontroller is coupled to the host microcontroller 302, and the host microcontroller 302 is coupled to the host lock interface 306), such a communicative coupling can be indirect or direct. For example, the module microcontroller 310 can be directly or indirectly coupled to the components of an electronic lock system, such as the host lock interface 506, the Zigbee communications unit 604, and/or the host proximity card reader 606. In some implementations, a direct coupling can be achieved by connecting an electrical wire between the module microcontroller 310 and the components of an electronic lock system. In some implementations, a direct coupling can be achieved through suitable wireless technology. In a direct coupling between the module microcontroller 310 and the components of an electronic lock system, the module microcontroller 310 can override the host microcontroller 502.

In some implementations, instead of receiving a command (e.g., a command to change the position of a locking component) from the module microcontroller 310 of a lock module 100, one or more of the components of an electronic lock system can receive a command from a communication subsystem, such as the module communication subsystem 312. For example, the module communication subsystem 312 can receive one or more commands from a server connected to a user interface running on a user device, and the module communication subsystem 312 can parse the one or more commands directly to the one or more components of the electronic lock system.

Because the module microcontroller can connect directly to the components of an electronic lock, the lock module can interface with and control the electronic lock regardless of the software, firmware, or hardware of the electronic lock system. For example, a host microcontroller of an electronic lock system (e.g., the host microcontroller 502 of the electronic lock system 500) can run software or firmware installed by the original equipment manufacturer of the electronic lock system. However, the lock module 100 can connect directly to the components of the electronic lock system, such as a motor or limit switch of the system, and therefore, the lock module can override or bypass the host microcontroller to control the components of the electronic lock system without using the installed software or firmware.

While some implementations of electronic lock systems are described as including one or more motors, limit switches, etc., in general, an electronic lock system can additionally or instead include one or more hardware components that individually or in combination perform the action of changing the position of a lockable structure of the electronic lock system. In general, a lock module, such as the lock module 100, can be configured to control any such hardware components of the electronic lock system, e.g., by using electrical signals to control the hardware components.

Existing electronic lock systems, such as the electronic lock system 600A, that include proximity card readers may be limited in how access of the proximity cards is updated to lock or unlock the lock systems. For example, existing lock attachment systems may allow a system administrator to remotely update or program the proximity card readers that are configured to communicate with a proximity card (e.g., to allow the proximity card readers to send a signal to lock or unlock a lockable structure in response to a certain proximity card coming within a certain distance to the proximity card reader). Once an administrator updates the proximity card reader, the updating process can be completed by holding the proximity card near an electronic updater that communicates with the proximity card reader. Therefore, even if an administrator grants a proximity card access to a particular electronic lock system, without first visiting an updater, the proximity card cannot be used to unlock the particular lock system. This presents a limitation of the updating process, in that a user must know where the updater is located and must travel to the updater with their proximity card in order for their card to be updated.

The systems and techniques described herein can be used to address the aforementioned limitation. For example, once the lock module 100 is communicatively coupled to an electronic lock system, such as the electronic lock system 600, the lock module, e.g., the module microcontroller 310, can interface directly with the host proximity card reader 606 to update a proximity card.

More specifically, in a first step, a first signal indicating a request to register a particular proximity card for the electronic lock system 600 is sent to a system administrator computing device for the lock module 100 (through a cell phone app, an entry system user interface, etc.). As used herein, registering a particular proximity card refers to updating one or more proximity card readers to recognize the particular proximity card, while updating a proximity card reader to recognize a particular proximity card refers to updating the proximity card reader so that a signal received from the particular proximity card causes the proximity card reader to output another signal indicating that the particular proximity card is an approved key that can be used to unlock or lock a lockable structure of an electronic lock system. The system administrator computing device for the lock module 100 processes the request (e.g., automatically based on predefined protocols) and outputs a second signal to the module microcontroller 310 of the lock module 100 indicating the request to register the particular proximity card. The module microcontroller 310 processes the second signal (such as through an automatic protocol stored in the memory unit 320) and outputs a third signal (such as through the RFID controller 314) to the host proximity card reader 606. The host proximity card reader 606 processes the third signal, which can be used to update the proximity card reader so that it recognizes the particular proximity card. In this manner, the particular proximity card can be granted access, allowing for the particular proximity card to unlock or lock a lockable structure of the electronic lock system without the separate step of using a physically isolated proximity card updater.

As yet another advantage over existing electronic lock systems, the lock module 100 can add smart home integration to a lock system. For example, the lock module 100 can connect to a WiFi or other communication network to which a smart home system is connected. The lock module 100 and the smart home system can communicate through the WiFi network, enabling joint functionalities.

For example, the lock module 100 can be communicatively coupled to a doorbell, and ringing the doorbell activates a camera and/or microphone of the lock module. Ringing the doorbell can prompt the microcontroller 310 of the lock module 100 to capture audio and/or visual data using the audio/video unit 328, and the audio or visual data can be sent to a smart home system that can play the audio and/or visual to a user of the smart home system. If the user recognizes the visitor, the user can prompt the smart home system (e.g., using a spoken command) to unlock the electronic lock system, and the smart home system can send a command to the lock module 100 to unlock the locking components of the electronic lock system. In some implementations, the audio/video unit 328 can include one or more speakers such that a smart home system can capture audio, which the system can send to the audio/video unit for playback. Therefore, in some implementations, the user and the visitor can have a conversation such that audio data is sent and played back by the lock module 100 and the smart home system.

As another example, a visitor arriving at an exterior door having an electronic lock system to which the lock module 100 is attached can prompt the lock module to activate a camera and/or microphone of the lock module. The activation of the camera and/or microphone can be based on motion, such that when the visitor comes within a threshold distance of the lock module 100, the camera and/or microphone is activated. When the camera and/or microphone is activated, the lock module 100 can send a notification to a smart home system to notify a user of the smart home system that a visitor has arrived.

In addition to communicating with a smart home system, the lock module 100 can communicate with a user interface for the lock module 100 (e.g., a user interface configured to run on a mobile device such as a smartphone, laptop, or tablet computer). For example, the lock module 100 can send audio or visual data that can be heard or viewed by a user using the user interface. As another example, a user can use a user interface for the lock module 100 to communicate one or more commands to a smart home system. The user interface receives the user input and sends a signal to the smart home system. The signal can correspond to a command that can be performed by the smart home system, such as unlocking a locking mechanism of an electronic lock system to which the lock module 100 is coupled.

FIG. 6B is a block diagram of another alternate embodiment of an electronic lock system 600B suitable for use with a lock module, such as the lock module 100. The electronic lock system 600B includes the first set of electronic components 501 combined with a third set of electronic components 602B, which includes the host Zigbee communications unit 604 and a host keypad 608. Communicatively and physically coupling the lock module 100 to the electronic lock system 600B can be performed by following a procedure similar to the one described with respect to the electronic lock system 500. In addition to being communicatively coupled to the host lock interface 506, the module microcontroller 310 of the lock module 100 can be communicatively coupled to the Zigbee communications unit 604 and the host keypad 608.

FIG. 6C is a block diagram of another alternate embodiment of an electronic lock system 600C suitable for use with a lock module, such as the lock module 100. The electronic lock system 600C includes the first set of electronic components 501 combined with a fourth set of electronic components 602C. In addition to the host proximity card reader 606 and the host keypad 608, the fourth set of electronic components also includes a host Bluetooth communications unit 610, a host WiFi unit 612, and a host camera unit 614. Accordingly, the electronic lock system 600C can communicate using Bluetooth and WiFi, and the system 600C can generate images using the host camera unit 614.

Yet another advantage provided by the communicative coupling between the lock module 100 and an electronic lock system, such as the electronic lock systems 500 and 600A-600C is that the lock module 100 can be used to update the electronic lock system remotely. For example, an administrator of the lock system can use a user interface for the lock module 100 (e.g., a user interface configured to run on a mobile device such as a smartphone, laptop, or tablet computer) to update one or more of the module components 300B or one or more of the first, second, third, or fourth sets of electronic components 501, 602A, 602B, or 602C. Enabling updates of an electronic lock system using the communicative coupling between the system and the lock module 100 can address limitations of current electronic lock systems that sync with a server (e.g., a cloud server) using a mobile device running a mobile app (e.g., by sending data using a data plan of the mobile device). Some conventional lock systems can only be updated or programmed through a mobile app or using an additional component such as a gateway. Such systems can be further limited in how they sync with a server. For example, some conventional lock systems require a user to physically visit the lock, connects to the lock and updates the lock using a mobile device app over the network connection of the mobile device. In other examples (e.g., when an electronic lock scans a mobile device using near field communication (NFC) or Bluetooth technology), the lock update is completed with the cellular data connection of the mobile device. The exemplary lock systems and modules disclosed herein can be updated remotely, thereby avoiding the need to be physically near the lock and/or update the lock using cellular data.

Yet another advantage provided by the lock module 100 is enabling a user to customize an existing electronic lock system according to their preferences. For example, a consumer may purchase the electronic lock system 600A, which includes proximity card functionality. However, the consumer may also want keypad functionality, but does not want to purchase the electronic lock system 600C, which includes both proximity card and keypad functionality.

While the lock module 100 includes proximity card, keypad, and other functionalities, in some implementations, a lock module can include only a subset of the functionalities of the lock module 100 depending on the desired customization needed. A consumer can add a lock module having keypad functionality to the electronic lock system 600A, achieving the desired combination of functionality.

In another example, the consumer may instead desire a combination of functionality that is not currently offered by any available electronic lock system. For example, none of the electronic lock systems 500, 600A, 600B, or 600C offer both proximity card functionality and biometric sensing functionality. To achieve this combination, the consumer can use a lock module that includes biometric sensing functionality with an existing electronic lock system, such as the electronic lock system 600A.

As used herein, a communicative coupling may use wireless communication signals such as radio frequency, electromagnetics, local area network (LAN), wide area network (WAN), virtual private network (VPN), wireless network (using 802.11, for example), 245 MHz, Z-WAVE™, cellular network (using 2G and/or LTE, for example), and/or other signals. In some embodiments, the module lock can further include one or more antennas and/or transceiver modules which may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB), etc. In some embodiments, each antenna may receive signals or information specific and/or exclusive to itself. In other embodiments, each antenna may receive signals or information not specific or exclusive to itself. In other embodiments, the signals associated with the communicative couplings may include various wired connections.

The module memory unit 320 may include random access memory (RAM), read only memory (ROM), flash RAM, other types of memory, or some combination thereof. In some embodiments, the module memory unit 320 can contain, among other things, the Basic Input-Output system (BIOS) which may control basic hardware and/or software operation such as the interaction with peripheral components or devices. The module memory unit 320 may store computer-readable, computer-executable software/firmware code which may include instructions that, when executed, cause a processor such as the module microcontroller 310 to perform various functions described in this disclosure (e.g., locking or unlocking a lock, gathering biometric data, registering an RFID device, etc.).

Alternatively, the software/firmware code may not be directly executable by the processor but may cause a computer to perform functions described herein. Alternatively, the computer-readable, computer-executable software/firmware code may not be directly executable by the processor but may be configured to cause a computer (e.g., when compiled and executed) to perform functions described herein. The processor may include an intelligent hardware device, e.g., a central processing unit (CPU), a microcontroller, an application-specific integrated circuit (ASIC), etc.

In some embodiments, all of the elements shown in FIG. 3B need not be present to practice the present systems and methods. Moreover, the devices and subsystems can be interconnected in different ways from that shown in FIG. 3B.

Further, it should be appreciated that embodiments of the present disclosure may employ any combination of features described herein. For instance, a lock module may include any combination of elements described with reference to FIGS. 1, 2B, 3B, or 4-6C. Moreover, the lock module may be used with a lock system having any combination of elements described with reference to FIGS. 2A, 3A, or 4-6C.

Code to implement aspects of the present disclosure can be stored in a non-transitory computer-readable medium such as the system module memory unit 320 or other memory. The operating system, which may be provided on input/output controller, may be iOS®, ANDROID®, MS-DOS®, MS-WINDOWS®, OS/2®, UNIX®, LINUX®, or another known operating system.

While illustrative embodiments have been illustrated and described, it will be appreciated that various changes can be made therein without departing from the spirit and scope of the disclosure.

Innovations

A lock module for use with an electronic lock configured to selectively lock a lockable structure includes a communication subsystem configured to be communicatively coupled to a gateway and configured to be communicatively coupled to an electronic lock, wherein the communication subsystem is further configured to send an unlock signal to the electronic lock.

In one aspect, the lock module includes one or more sensors configured to receive an input used to selectively lock the lockable structure.

In one aspect, the one or more sensors includes at least one of a biometric sensor, an RFID antenna, an occupancy sensor, and an environmental sensor.

In one aspect, the communication subsystem of the lock module is configured to communicatively couple to a first additional communication subsystem of a first additional lock module.

In one aspect, the communication subsystem is configured to communicate a signal to the gateway, the signal being sent from the first additional communication subsystem to the communication subsystem and from the communication subsystem to the gateway.

In one aspect, the communication subsystem is a Z-wave communication node, and the first additional communication subsystem of a first additional lock module and a second additional communication subsystem of a second additional lock module form a Z-wave mesh network.

In one aspect, the communication subsystem of the lock module is further configured to communicatively couple to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

In one aspect, the lock module further includes an RFID controller and an RFID antenna connector communicatively coupled to a module microcontroller, wherein the RFID antenna connector is configured to send and receive signals to and from an RFID antenna of the electronic lock.

In one aspect, the one or more sensors includes a touchpad subsystem associated with the housing, the touchpad subsystem including a surface configured to select one or more of a plurality of selectable buttons of an electronic lock.

In one aspect, the communication subsystem receives an unlock signal configured to change one or more electrical properties of the touchpad subsystem, the change in the one or more electrical properties causing the touchpad subsystem to select one or more of the plurality of selectable buttons of the electronic lock.

An electronic lock includes a lock configured to selectively lock a lockable structure, and a lock module communicatively coupled to the lock. The lock module includes a communication subsystem configured to be communicatively coupled to a gateway and configured to be communicatively coupled to the electronic lock, wherein the communication subsystem is further configured to send an unlock signal to the electronic lock, and wherein receipt of the unlock signal by the electronic lock causes the electronic lock to unlock the lockable structure.

In one aspect, the communication subsystem of the lock module is further configured to communicatively couple the communication subsystem to a first additional communication subsystem of a first additional lock module.

In one aspect, the first additional communication subsystem is configured to communicate a signal to the gateway, the signal being sent from the first additional communication subsystem to the communication subsystem and from the communication subsystem to the gateway.

In one aspect, the communication subsystem of the lock module is further configured to communicatively couple the communication subsystem to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

An entry system includes a first electronic lock configured to selectively lock a first lockable structure, and a second electronic lock configured to selectively lock a second lockable structure. The first electronic lock includes a first locking component moveable between at least an engaged position and a disengaged position, a first lock microcontroller configured to actuate the first locking component in response to at least one input signal, and a first communication subsystem communicatively coupled to a first gateway. The second electronic lock includes a second locking component moveable between at least an engaged position and a disengaged position, a second lock microcontroller configured to actuate the second locking component in response to at least one input signal, and a second communication subsystem communicatively coupled to the first communication subsystem of the first lock module.

In one aspect, the first electronic lock includes a first lock module having a first lock module microcontroller communicatively coupled to the first locking component and the first communication subsystem communicatively coupled to the first gateway.

In one aspect, the first electronic lock includes a first lock module having a first lock module microcontroller communicatively coupled to the first lock microcontroller and the first communication subsystem communicatively coupled to the first gateway.

In one aspect, the second electronic lock includes a second lock module having a second lock module microcontroller communicatively coupled to the second locking component and the second communication subsystem communicatively coupled to the first communication subsystem.

In one aspect, the second electronic lock includes a second lock module having a second lock module microcontroller communicatively coupled to the second lock microcontroller and the second communication subsystem communicatively coupled to the first communication subsystem.

In one aspect, the first gateway is electrically coupled to at least a second gateway.

In one aspect, the first gateway and the at least second gateway are electrically coupled through a series connection.

In one aspect, the first gateway and the at least second gateway are powered using a power over Ethernet (POE) standard, and more particularly, wherein the POE standard is POE++.

In one aspect, the first and second electronic locks each further comprise one or more sensors configured to receive the at least one input signal used to selectively lock the lockable structure.

In one aspect, the one or more sensors includes at least one of a biometric sensor, an RFID antenna, an occupancy sensor, and an environmental sensor.

In one aspect, the first communication subsystem is configured to communicate a signal to the first gateway, the signal being sent from the second communication subsystem to the first communication subsystem and from the first communication subsystem to the first gateway.

In one aspect, the first communication subsystem is a Z-wave communication node, and the second communication subsystem and a third communication subsystem of a third electronic lock form a Z-wave mesh network.

In one aspect, the first communication subsystem is configured to communicate a signal to the third communication subsystem, the signal being sent from the first communication subsystem to the second communication subsystem and from the second communication subsystem to the third communication subsystem.

In one aspect, the first electronic lock further comprises an RFID controller and an RFID antenna connector communicatively coupled to the first module microcontroller, wherein the RFID antenna connector is configured to send and receive signals to and from an RFID antenna of the first electronic lock.

A lock module for use with an electronic lock is configured to selectively lock a lockable structure. The electronic lock includes a surface configured to register a selection of a plurality of selectable buttons. The lock module includes a housing, a communication subsystem disposed at least partially within the housing, the communication subsystem configured to be communicatively coupled to a gateway, and a touchpad subsystem associated with the housing, the touchpad subsystem including a surface configured to select one or more of the plurality of selectable buttons.

In one aspect, the communication subsystem of the lock module is configured to communicatively couple to a first additional communication subsystem of a first additional lock module.

In one aspect, the first additional communication subsystem is configured to communicate a signal to the gateway, the signal being sent from the first additional communication subsystem to the communication subsystem and from the communication subsystem to the gateway.

In one aspect, the communication subsystem of the lock module is further configured to communicatively couple to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

In one aspect, the surface of the electronic lock is an underlying surface relative to the surface of the touchpad subsystem.

In one aspect, the communication subsystem receives an unlock signal configured to change one or more electrical properties of the touchpad subsystem, the change in the one or more electrical properties causing the touchpad subsystem to select one or more of the plurality of selectable buttons of the electronic lock.

In one aspect, the selection of one or more of the plurality of selectable buttons causes the electronic lock to unlock the lockable structure.

In one aspect, the gateway is electrically coupled to one or more additional gateways.

In one aspect, the gateway and at least one of the one or more additional gateways are electrically coupled through a series connection.

In one aspect, the gateway and at least one of the one or more additional gateways are powered using a power over Ethernet (POE) standard. In one aspect, the POE standard is POE++.

An electronic lock includes a lock configured to selectively lock a lockable structure and a lock module communicatively coupled to the lock. The lock module includes a communication subsystem configured to be communicatively coupled to a gateway and communicatively coupled to the electronic lock. The communication subsystem is further configured to send an unlock signal to the electronic lock, and receipt of the unlock signal by the electronic lock causes the electronic lock to unlock the lockable structure.

In one aspect, the communication subsystem of the lock module is further configured to communicatively couple the communication subsystem to a first additional communication subsystem of a first additional lock module.

In one aspect, the first additional communication subsystem is configured to communicate a signal to the gateway, the signal being sent from the first additional communication subsystem to the communication subsystem and from the communication subsystem to the gateway.

In one aspect, the communication subsystem of the lock module is further configured to communicatively couple the communication subsystem to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

In one aspect, the gateway is electrically coupled to one or more additional gateways.

In one aspect, the gateway and at least one of the one or more additional gateways are electrically coupled through a series connection.

In one aspect, the gateway and at least one of the one or more additional gateways are powered using a power over Ethernet (POE) standard. In one aspect, the POE standard is POE++.

An electronic lock system includes a lock configured to selectively lock a lockable structure and a lock module communicatively coupled to the lock. The lock module includes a communication subsystem configured to be communicatively coupled to a gateway and communicatively coupled to the electronic lock. The communication subsystem is further configured to send an unlock signal to the electronic lock, and receipt of the unlock signal by the electronic lock causes the electronic lock to unlock the lockable structure. The electronic lock system further includes a mesh network configured to communicatively couple the lock module to a gateway and communicatively couple the lock module to one or more additional lock modules.

In one aspect, the lock module receives, from an additional lock module of the one or more additional lock modules, a signal addressed to the gateway, and wherein the lock module sends the signal to the gateway.

In one aspect, the communication subsystem of the lock module is further configured to communicatively couple the communication subsystem to a first additional communication subsystem of a first additional lock module.

In one aspect, the first additional communication subsystem is configured to communicate a signal to the gateway, the signal being sent from the first additional communication subsystem to the communication subsystem and from the communication subsystem to the gateway.

In one aspect, the communication subsystem of the lock module is further configured to communicatively couple the communication subsystem to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

In one aspect, the gateway is electrically coupled to one or more additional gateways.

In one aspect, the gateway and at least one of the one or more additional gateways are electrically coupled through a series connection.

In one aspect, the gateway and at least one of the one or more additional gateways are powered using a power over Ethernet (POE) standard. In one aspect, the POE standard is POE++.

A lock module for use with an electronic lock configured to selectively lock a lockable structure includes a communication subsystem configured to be communicatively coupled to a gateway and configured to be communicatively coupled to the electronic lock. The communication subsystem is further configured to send an unlock signal to the electronic lock and communicatively couple the communication subsystem to a first additional communication subsystem of a first additional lock module. Receipt of the unlock signal by the electronic lock causes the electronic lock to unlock the lockable structure.

In one aspect, the first additional communication subsystem is configured to communicate a signal to the gateway, the signal being sent from the first additional communication subsystem to the communication subsystem and from the communication subsystem to the gateway.

In one aspect, the communication subsystem of the lock module is further configured to communicatively couple the communication subsystem to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

In one aspect, the gateway is electrically coupled to one or more additional gateways.

In one aspect, the gateway and at least one of the one or more additional gateways are electrically coupled through a series connection.

In one aspect, the gateway and at least one of the one or more additional gateways are powered using a power over Ethernet (POE) standard. In one aspect, the POE standard is POE++.

A lock module for use with an electronic lock configured to selectively lock a lockable structure includes a communication subsystem configured to be communicatively coupled to a gateway, and one or more sensors configured to receive an input used to selectively lock the lockable structure.

In one aspect, the one or more sensors includes a biometric sensor.

In one aspect, the biometric sensor includes a fingerprint scanner, a retina or iris scanner, or a facial recognition engine.

In one aspect, the one or more sensors includes an RFID antenna.

In one aspect, the gateway is electrically coupled to one or more additional gateways.

In one aspect, the gateway and at least one of the one or more additional gateways are electrically coupled through a series connection.

In one aspect, the gateway and at least one of the one or more additional gateways are powered using a power over Ethernet (POE) standard. In one aspect, the POE standard is POE++.

A method for controlling an electronic lock system includes operably connecting a lock module to a lock configured to selectively lock a lockable structure, receiving, by the lock module, information corresponding to unlocking the lockable structure, wherein receipt of the information causes the lock module to unlock the lockable structure.

In one aspect, the information includes an access code.

In one aspect, communicating the information to the lock includes changing one or more electrical properties of a touchpad subsystem of the lock module such that the change in the one or more electrical properties causes the touchpad subsystem to enter the access code to a touch-sensitive keypad of the lockable structure.

In one aspect, the method further comprises determining, by the lock module, that the lockable structure is locked.

In one aspect, determining that the lockable structure is locked comprises using a limit switch of the electronic lock system.

In one aspect, unlocking the lockable structure by the lock module includes sending a signal from the lock module to a motor of the electronic lock system, the motor of the electronic lock system being configured to unlock the lockable structure.

An entry system includes an electronic lock configured to selectively lock a lockable structure. The electronic lock includes a power supply, a locking component, one or more limit switches configured to detect a position of the locking component moveable between at least an engaged position and a disengaged position, and one or more motors configured to actuate the locking component between the engaged and disengaged positions. The system further includes a first lock module coupled to the electronic lock having a first communication subsystem configured to be communicatively coupled to a second communication subsystem of a second lock module, and a microcontroller communicatively coupled to at least one of the one or more motors and at least one of the one or more limit switches.

In one aspect, the microcontroller is configured to receive a signal from the at least one of the one or more limit switches indicating at least one of the engaged and disengaged positions of the locking component.

In one aspect, the microcontroller is configured to send a signal to at least one of the one or more motors, the signal causing the motor to actuate the locking component.

In one aspect, the lock module is powered by the power supply.

A lock module for communicative coupling to an electronic lock configured to selectively lock a lockable structure includes a communication subsystem configured to be communicatively coupled to a gateway and configured to be communicatively coupled to an electronic lock, wherein the communication subsystem is further configured to send an unlock signal to the electronic lock.

In one aspect, the communication subsystem of the lock module is configured to communicatively couple to a first additional communication subsystem of a first additional lock module.

In one aspect, the first additional communication subsystem is configured to communicate a signal to the gateway, the signal being sent from the first additional communication subsystem to the communication subsystem and from the communication subsystem to the gateway.

In one aspect, the communication subsystem of the lock module is further configured to communicatively couple to a second additional communication subsystem of a second additional lock module, and the first additional communication subsystem is configured to communicate a signal to the second additional communication subsystem, the signal being sent from the first additional communication subsystem to the communication subsystem and from the communication subsystem to the second additional communication subsystem.

In one aspect, the gateway is electrically coupled to one or more additional gateways.

In one aspect, the gateway and at least one of the one or more additional gateways are electrically coupled through a series connection.

In one aspect, the gateway and at least one of the one or more additional gateways are powered using a power over Ethernet (POE) standard. In one aspect, the POE standard is POE++.

A method of registering a proximity card for selectively activating one or more electronic lock systems when the proximity card is brought within a predefined distance of a proximity card reader of the one or more electronic lock systems includes:
receiving, at a system administrator computing device, a first signal indicating a registration request for the proximity card such that the proximity card can selectively activate one or more electronic lock systems managed by the system administrator computing device;
sending, by the system administrator computing device, a second signal to the one or more electronic lock systems indicating registration of the proximity card;
processing, at the one or more electronic lock systems, the second signal and outputting a third signal containing registration data for the proximity card reader of the one or more electronic lock systems; and
receiving, by the proximity card reader of the one or more electronic lock systems, the third signal to update the proximity card reader with the registration data to activate at least one of the one or more electronic lock systems when the proximity card is brought within a predefined distance of the proximity card reader of the one or more electronic lock systems.

In one aspect, the proximity card reader is a component of a lock module communicatively coupled to at least one of the one or more electronic lock systems.

In one aspect, the proximity card reader is a component of the at least one of the one or more electronic lock systems.

In one aspect, the step of processing, at the one or more electronic lock systems, the second signal and outputting a third signal containing registration data for the proximity card reader of the one or more electronic lock systems occurs when the proximity card is outside the predefined distance of the proximity card reader.

In one aspect, the step of processing the second signal and outputting a third signal containing registration data for the proximity card reader of the one or more electronic lock systems occurs within a lock module communicatively coupled to one of the one or more electronic lock systems.

In one aspect, the lock module includes a housing and a communication subsystem disposed at least partially within the housing.

The invention claimed is:

1. An entry system comprising:
a first electronic lock configured to selectively lock a first lockable structure, the first electronic lock comprising:
   a first battery;
   a first port connected an external power source as a redundant power source to the battery;
   a first locking component moveable between at least an engaged position and a disengaged position;
   a first lock microcontroller configured to actuate the first locking component in response to at least one input signal; and
   a first communication subsystem communicatively coupled to a first gateway; and
a second electronic lock configured to selectively lock a second lockable structure, the second electronic lock comprising:
   a second battery;
   a second port connected a second external power source as a second redundant power source to the second battery;
   a second locking component moveable between at least an engaged position and a disengaged position;
   a second lock microcontroller configured to actuate the second locking component in response to at least one input signal; and
   a second communication subsystem communicatively coupled to the first communication subsystem of the first electronic lock, wherein the first gateway is electrically coupled to a second gateway and wherein the first gateway and the second gateway are powered using a power over Ethernet (POE) standard comprising POE++.

2. The entry system of claim 1, wherein the first electronic lock includes a first lock module having a first lock module microcontroller communicatively coupled to the first locking component and the first communication subsystem communicatively coupled to the first gateway.

3. The entry system of claim 2, wherein the second electronic lock includes a second lock module having a second lock module microcontroller communicatively coupled to the second locking component and the second communication subsystem communicatively coupled to the first communication subsystem.

4. The entry system of claim 1, wherein the first electronic lock includes a first lock module having a first lock module microcontroller communicatively coupled to the first lock microcontroller and the first communication subsystem communicatively coupled to the first gateway.

5. The entry system of claim 4, wherein the second electronic lock includes a second lock module having a second lock module microcontroller communicatively coupled to the second lock microcontroller and the second communication subsystem communicatively coupled to the first communication subsystem.

6. The entry system of claim 1, wherein the first gateway and the second gateway are electrically coupled through a series connection.

7. The entry system of claim 1, wherein the first electronic lock and the second electronic lock each further comprise one or more sensors configured to receive the at least one input signal used to selectively lock the first lockable structure and the second lockable structure.

8. The entry system of claim 7, wherein the one or more sensors includes at least one of a biometric sensor, an RFID antenna, an occupancy sensor, and an environmental sensor.

9. The entry system of claim 1, wherein the first communication subsystem is configured to communicate a signal to the first gateway, the signal being sent from the second communication subsystem to the first communication subsystem and from the first communication subsystem to the first gateway.

10. The entry system of claim 9, wherein the first communication subsystem is a Z-wave communication node, and wherein the second communication subsystem and a third communication subsystem of a third electronic lock form a Z-wave mesh network.

11. The entry system of claim 10, wherein the first communication subsystem is configured to communicate a signal to the third communication subsystem, the signal being sent from the first communication subsystem to the second communication subsystem and from the second communication subsystem to the third communication subsystem.

12. The entry system of claim 1, wherein the first electronic lock further comprises radio frequency identification (RFID) controller and an RFID antenna connector communicatively coupled to a first module microcontroller, wherein the RFID antenna connector is configured to send and receive signals to and from an RFID antenna of the first electronic lock.

13. A system comprising:
a first electronic lock configured to selectively lock a lockable structure, the first electronic lock comprising:
a first battery;
a first port connected an external power source as a redundant power source to the battery; and
a first lock module configured to be communicatively coupled to the first electronic lock, the first lock module comprising:
a first communication subsystem configured to be communicatively coupled to a first gateway and configured to be communicatively coupled to the first electronic lock, wherein the first communication subsystem is further configured to send an unlock signal to the first electronic lock, and wherein receipt of the unlock signal by the first electronic lock causes the first electronic lock to unlock the lockable structure;
a second electronic lock comprising:
a second battery;
a second port connected a second external power source as a second redundant power source to the second battery; and
a second lock module configured to be communicatively coupled to the second electronic lock, the second lock module comprising:
a second communication subsystem, wherein the first lock module and the second lock module form a mesh network that enables communication between the first communication subsystem of the first lock module and the second communication subsystem of the second lock module, wherein the first gateway is electrically coupled to a second gateway and wherein the first gateway and the second gateway are powered using a power over Ethernet (POE) standard comprising POE++.

14. The system of claim 13, wherein the second communication subsystem is configured to communicate a signal to the first gateway, the signal being sent from the second communication subsystem to the first communication subsystem and from the first communication subsystem to the first gateway.

15. The system of claim 13, wherein the first communication subsystem of the first lock module is further configured to communicatively couple the first communication subsystem to the second communication subsystem of the second lock module, and
wherein the second communication subsystem is configured to communicate a signal to a third communication subsystem, the signal being sent from the second communication subsystem to the first communication subsystem and from the first communication subsystem to the third communication subsystem.

* * * * *